US008479124B1

(12) United States Patent
Baxter et al.

(10) Patent No.: US 8,479,124 B1
(45) Date of Patent: Jul. 2, 2013

(54) GRAPHICAL USER INTERFACE (GUI) INCLUDING INPUT FILES WITH INFORMATION THAT DETERMINES REPRESENTATION OF SUBSEQUENT CONTENT DISPLAYED BY THE GUI

(75) Inventors: Glenn A. Baxter, Los Gatos, CA (US); Brian L. Forsse, Scotts Valley, CA (US)

(73) Assignee: Xilinx, Inc., San Jose, CA (US)

( * ) Notice: Subject to any disclaimer, the term of this patent is extended or adjusted under 35 U.S.C. 154(b) by 663 days.

(21) Appl. No.: 11/706,610

(22) Filed: Feb. 14, 2007

(51) Int. Cl.
*G06F 3/048* (2006.01)

(52) U.S. Cl.
USPC .......................................... 715/964; 326/37

(58) Field of Classification Search
USPC .......................................... 715/964; 326/37
See application file for complete search history.

(56) References Cited

U.S. PATENT DOCUMENTS

| | | | |
|---|---|---|---|
| 4,349,870 A | 9/1982 | Shaw et al. | |
| 4,511,964 A | 4/1985 | Georg et al. | |
| 4,912,632 A | 3/1990 | Gach et al. | |
| 5,617,367 A | 4/1997 | Holland et al. | |
| 5,651,112 A | 7/1997 | Matsuno et al. | |
| 5,666,521 A | 9/1997 | Marisetty | |
| 5,761,478 A | 6/1998 | Chen et al. | |
| 5,768,500 A | 6/1998 | Agrawal et al. | |
| 5,804,986 A | 9/1998 | Jones | |
| 5,870,349 A | 2/1999 | Lattimore et al. | |
| 5,889,987 A | 3/1999 | Nelson et al. | |
| 6,151,682 A | 11/2000 | van der Wal et al. | |
| 6,329,839 B1 | 12/2001 | Pani et al. | |
| 6,333,935 B1 | 12/2001 | Carr et al. | |
| 6,353,332 B1 | 3/2002 | Brelet | |
| 6,373,779 B1 | 4/2002 | Pang et al. | |
| 6,567,564 B1 * | 5/2003 | van der Wal | 382/260 |
| 6,601,130 B1 | 7/2003 | Silvkoff et al. | |
| 6,601,149 B1 | 7/2003 | Brock et al. | |
| 6,662,285 B1 | 12/2003 | Douglass et al. | |
| 6,754,786 B2 | 6/2004 | Suzuki et al. | |
| 6,792,458 B1 | 9/2004 | Muret et al. | |
| 6,799,304 B2 | 9/2004 | Hammitt et al. | |
| 6,871,312 B2 | 3/2005 | Hatley | |
| 6,983,393 B2 | 1/2006 | Truchard et al. | |
| 7,020,802 B2 | 3/2006 | Gross et al. | |
| 7,072,800 B1 | 7/2006 | Fernandez et al. | |
| 7,076,595 B1 | 7/2006 | Dao et al. | |
| 7,120,761 B2 | 10/2006 | Matsuzaki et al. | |
| 7,146,448 B2 | 12/2006 | Davies et al. | |
| 7,206,891 B2 | 4/2007 | Emerson et al. | |
| 7,225,301 B2 | 5/2007 | Furtek et al. | |
| 7,260,688 B1 | 8/2007 | Baxter et al. | |

(Continued)

OTHER PUBLICATIONS

Xilinx, Inc., "High Performance Multi-Port Memory Controller", XAPP535, Dec. 10, 2004.*

(Continued)

*Primary Examiner* — Andrea Leggett
(74) *Attorney, Agent, or Firm* — John J. King

(57) ABSTRACT

A graphical user interface (GUI) used to program complex hardware elements is provided that allows a variety of files to be used to control subsequent content displayed by the GUI. The control includes dynamic updating of actual GUI elements, as well as rule checking based upon data entered into the GUI. Configuration, rule, and GUI files can be used to control the eventual programming of the complex hardware elements. Graphical metaphors are established to enable the viewing of performance information and using that information to control the programming of the complex hardware elements.

19 Claims, 19 Drawing Sheets

U.S. PATENT DOCUMENTS

| | | | |
|---|---|---|---|
| 7,287,196 | B2 | 10/2007 | Gerard |
| 7,308,540 | B2 | 12/2007 | Leijten |
| 7,308,564 | B1 | 12/2007 | Jenkins, IV |
| 7,424,553 | B1 | 9/2008 | Borrelli et al. |
| 7,454,546 | B1 | 11/2008 | Lilley |
| 2003/0036875 | A1* | 2/2003 | Peck et al. .................... 702/127 |
| 2004/0064646 | A1* | 4/2004 | Emerson et al. .............. 711/131 |
| 2004/0075690 | A1 | 4/2004 | Cirne |
| 2005/0060456 | A1* | 3/2005 | Shrader et al. ................ 710/240 |
| 2006/0047992 | A1 | 3/2006 | Gerard |

OTHER PUBLICATIONS

U.S. Appl. No. 11/341,003, filed Jan. 27, 2006, Xilinx, Inc. 2100 Logic Drive, San Jose, CA 95124 (Issued as Patent No. 7,454,546 B1).

U.S. Appl. No. 10/824,967, filed Apr. 15, 2004, Xilinx, Inc. 2100 Logic Drive, San Jose, CA 95124 (Issued as Patent No. 7,260,688 B1).

U.S. Appl. No. 10/824,713, filed Apr. 15, 2004, Xilinx, Inc. 2100 Logic Drive, San Jose, CA 95124 (Issued as Patent No. 7,225,278 B1).

U.S. Appl. No. 10/824,715, filed Apr. 15, 2004, Xilinx, Inc. 2100 Logic Drive, San Jose, CA 95124 (Issued as Patent No. 7,424,555 B1).

Xilinx, Inc., "Gigabit System Reference Design", XAPP536, Jun. 3, 2004, pp. 1-51, v1.1, available from Xilinx, Inc., 2100 Logic Drive, San Jose, CA 95124.

Xilinx, Inc., "High Performance Multi-Port Memory Controller", XAPP535, Dec. 10, 2004, pp. 1-190, v1.1, available from Xilinx, Inc., 2100 Logic Drive, San Jose, CA 95124.

Lilley, Jennifer R. et al., "Architecture for Dynamically Reprogrammable Arbitration Using Memory", U.S. Appl. No. 11/341,033, filed Jan. 27, 2006, pp. 1-23, available from Xilinx, Inc., 2100 Logic Drive, San Jose, CA 95124.

Baxter Glenn A. et al. Method and Apparatus for Controlling Access to Memory Circuitry, U.S. Appl. No. 10/824,967, filed Apr. 15, 2004, pp. 1-76, available from Xilinx, Inc., 2100 Logic Drive, San Jose, CA 95124.

Baxter, Glenn A. et al., "Method and Apparatus for Controlling Direct Access to Memory Circuitry", U.S. Appl. No. 10/824,713, filed Apr. 15, 2004, pp. 1-75, available from Xilinx, Inc., 2100 Logic Drive, San Jose, CA 95124.

Borrelli, Christopher, J. et al., "Method and Apparatus for Communicatinp Data Between a Network Transceiver and Memory Circuitry", U.S. Appl. No. 10/824,715, filed Apr. 15, 2004, pp. 1-75, available from Xilinx, Inc., 2100 Logic Drive, Jose, CA 95124.

Xilinx, Inc. "Multi Port Memory Controller—MPMC2", Oct. 20, 2006, 2 pages, v.1.7, available from Xilinx, Inc., 2100 Logic Drive, San Jose, CA 95124.

U.S. Appl. No. 11/707,175, filed Feb. 14, 2007 Xilinx, Inc. 2100 Logic Drive, San Jose, CA 95124.

U.S. Appl. No. 11/706,556, filed Feb. 14, 2007, Xilinx, Inc. 2100 Logic Drive, San Jose, CA 95124.

U.S. Appl. No. 11/707,108, filed Feb. 14, 2007, Xilinx, Inc. 2100 Logic Drive, San Jose, CA 95124.

U.S. Appl. No. 11/706,610, filed Feb. 14, 2007, Xilinx, Inc. 2100 Logic Drive, San Jose, CA 95124.

ARM Limited, ARM PrimeCell MultiPort Memory Controller (PL172) Revision r2p1, Technical Reference Manual 2002, Jan. 2002, pp. ii-index4, http://www.arm.com.

Microtronix, Avalon Multi-Port SDRAM Controller, User Manual, Version 2.6, Feb. 2010, pp. 1-30, Microtronix, 9-1510 Woodcock St., London, ON, Canada.

STMicroeletronics, Configuring the SPEAr600 multi-port memory controller for external DDR SDRAM, , Application Note AN3132, Jan. 6, 2010, pp. 1-24, www.st.com.

ZIPcores.com, MEM_ARBITER, Multi-ported Memory Controller-Arbiter, Rev. 1.0 2009, Jun. 22, 2009, pp. 1-5, ZIPcores.com.

\* cited by examiner

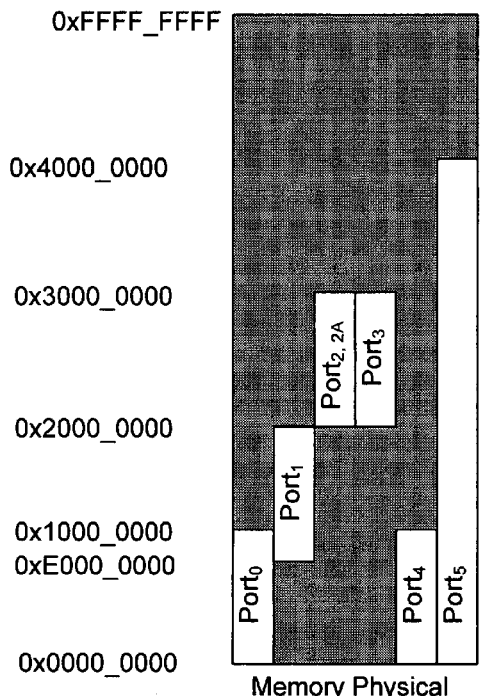
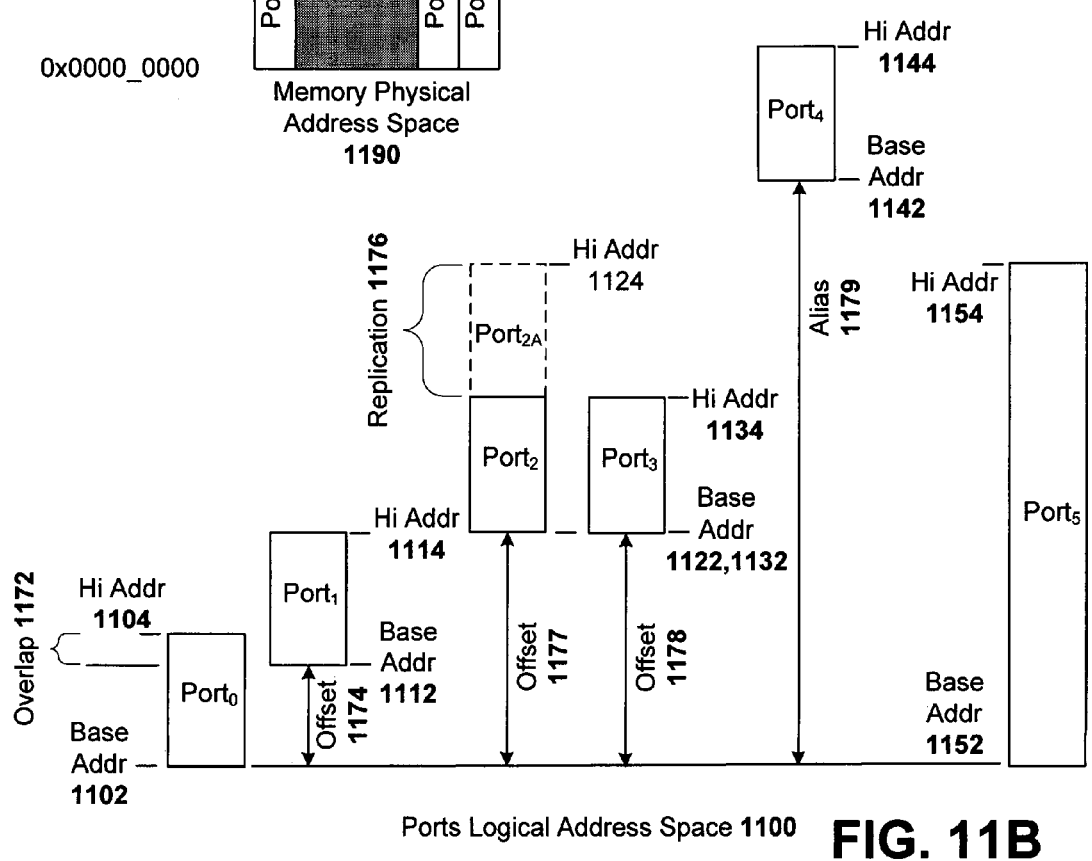
FIG. 11A
FIG. 11B

FIG. 14

GRAPHICAL USER INTERFACE (GUI) INCLUDING INPUT FILES WITH INFORMATION THAT DETERMINES REPRESENTATION OF SUBSEQUENT CONTENT DISPLAYED BY THE GUI

CROSS-REFERENCE TO RELATED APPLICATIONS

Embodiments of the present invention as described herein are related to the following patent applications, all of which are incorporated by reference herein in their entirety:

U.S. patent application Ser. No. 10/824,967, entitled "Method And Apparatus For Controlling Access To Memory Circuitry," with inventors Glenn A. Baxter et al., filed Apr. 15, 2004;

U.S. patent application Ser. No. 10/824,713, entitled "Method And Apparatus For Controlling Direct Access To Memory Circuitry," with inventors Glenn A. Baxter et al., filed Apr. 15, 2004;

U.S. patent application Ser. No. 10/824,715, entitled "Method And Apparatus For Communicating Data Between A Network Transceiver And Memory," with inventors Christopher J. Borrelli et al., filed Apr. 15, 2004; and U.S. patent application Ser. No. 11/341,003, entitled "Architecture For Dynamically Programmable Arbitration Using Memory," with inventor Jennifer R. Lilley, filed Jan. 27, 2006.

BACKGROUND

1. Technical Field

Embodiments of the present invention relate to features of a versatile Multi-Port Memory Controller (MPMC) that can be included in a system to control access to memory from processors, devices, or buses.

2. Related Art

A conventional processor-based system includes a processor along with a memory, and one or more peripheral devices. The memory stores data and instructions for the computing system. The peripheral devices can include components such as graphics cards, keyboard interfaces, and network interface cards. The computing system can include a system bus to facilitate communication among the processor and peripheral devices and the memory.

With memory access provided through a system bus providing for processor and peripheral devices, arbitration must be performed to gain access to ports of the bus. However, on a shared bus, arbitration is a serial process. That is, a component must request bus access, be granted bus access to the exclusion of all other components, and then perform a memory transaction. The bus arbitration overhead may not allow the full bandwidth capabilities of the memory to be utilized. For instance, the memory is not being kept busy during the time when components are requesting and receiving access to the system bus.

Conventional processor-based systems use some form of memory controller in order to access memory devices and provide arbitration to the memory for the processor and peripherals. Requirements for a memory controller to communicate with different type components and bus structures can decrease bandwidth from the normal operation of a bus-based system. To address the need to configure a memory controller to provide maximum bandwidth when used with various processor systems, a programmable logic device such as an Field Programmable Gate Array (FPGA) has been used to create the memory controller. FPGAs can be used to provide a wide variety of these memory controllers, including single port and multi port memory controllers.

FIG. 1 shows a block diagram of an FPGA 102 that can be used as a memory controller. The FPGA 102 illustratively comprises programmable or configurable logic circuits or "blocks," shown as CLBs 104, I/O Blocks (IOBs) 106, and programmable interconnects 108, as well as configuration memory 116 for determining the functionality of the FPGA 102. The FPGA 102 may also include an embedded processor block 114, as well as various dedicated internal logic circuits, illustratively shown as blocks of random access memory ("BRAM 110"), and digital clock management (DCM) blocks 112. For a memory controller, the components of the FPGA 102 can be used to control an external memory 150. Those skilled in the art will appreciate that the FPGA 102 may include other types of logic blocks and circuits in addition to those described herein.

The IOBs 106, the CLBs 104, and the programmable interconnects 108 may be configured to perform a variety of functions. Notably, the CLBs 104 are programmably connectable to each other, and to the IOBs 106, via the programmable interconnect 108. Each CLB slice in turn includes various circuits, such as flip-flops, function generators (e.g., look-up tables (LUTs)), logic gates, and memory. The IOBs 106 are configured to provide input to, and receive output from, the CLBs 104.

Configuration information for the CLBs 104, the IOBs 106, and the programmable interconnect 108 is stored in the configuration memory 116. The configuration memory 116 can include static random access memory (SRAM) cells. A configuration bit stream to program the configuration memory 116 can be produced from the program memory 120.

The IOBs 106 can include transceiver circuitry configured for communication over any of a variety of media, such as wired, wireless, and photonic, whether analog or digital. The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, and typically associated control logic. Notably, such a microprocessor core may include embedded hardware or embedded firmware or a combination. A soft microprocessor 134 may be implemented using the programmable logic of the FPGA 102 (e.g., CLBs 104 and IOBs 106).

As one example, the FPGA used to make an MPMC can be one selected from the Virtex-4 family of products, commercially available from Xilinx, Inc. of San Jose, Calif.

To enable high data-rate communications (e.g., 1200 megabits per second full duplex), the FPGA can be configured as an MPMC with built-in arbitration logic. A typical MPMC will have a fixed number of ports to communicate with components connecting to a memory device. For example, the MPMC may include a port for communicating directly with a central processing unit (CPU) (e.g., an instruction-side processor local bus) and/or a port for communicating with a system bus.

Current MPMC designs have performance issues because of their fixed or non-flexible implementation or architecture. Notably, the systems have a fixed implementation because the port types cannot be changed, and the number of ports remains fixed. Further, they have a fixed arbitration scheme. The systems tend to have port connections to two buses, one for high-speed entities, and one for low-speed entities. The implementation of each of these entities affects the performance such that the lowest performing device on each bus sets the highest frequency possible on that bus. Some system ports are typically dedicated for connection to a CDMAC to allow for direct memory access. Current systems therefore can suffer performance degradation depending on design constraints.

It is desirable to define topologies to efficiently use the components of an FPGA to develop a memory controller. In particular, it is desirable to provide an MPMC that can allow source code to be efficiently changed dynamically to handle a desired number of ports, while maximizing system performance and providing compatibility with a number of different components including peripherals and memory devices that can be connected to the memory controller.

SUMMARY

According to embodiments of the present invention, a universal memory controller is provided that can be dynamically made compatible with multiple types of memory as well as multiple types of memory system organizations. Different system topologies are provided through configurable logic. The MPMC configuration provided offers substantially higher bandwidth to devices because of its architecture. It offers freedom of implementation so that customers can trade off area and performance. One implementation uses the resources provided by FPGA technology to efficiently implement the MPMC based system topology.

In some embodiments of the present invention, an MPMC is provided with a self-aligning programmable state machine to provide dynamic compatibility between the MPMC and various memory devices. The self-alignment is provided using shift register look up tables (SRLs) connected to the output of the BRAM state machine forming a part of the MPMC controller. Unlike the fixed implementation of a BRAM-only state machine of conventional systems, this state machine is capable of being updated both dynamically, and statically by providing a delay input to the SRLs and/or updating its contents. This alignment is a key to supporting the dynamic nature of adaptation to various memory organizations, speeds, and timing requirements.

In other embodiments of the present invention, configurable Port Interface Modules (PIMs) are provided on MPMCs ports to enable programmable connection to different type devices, processors, or buses. The PIMs include logic that can be programmed to provide functions ranging from the simple function of a simple direct link, such as a native port interface (NPI), to a more complex DMA such as a CDMAC. The PIMs allow for communication within a wealth of different system topologies. The PIM can further include protocol bridges to allow the PIM to communicate with other PIMs to form a master, slave or master/slave port or a combination thereof. As a master port, the PIM can shift communications from one port to the PIM of another port that provides the necessary translation from a device connected. In this manner, efficient use of the ports is made, and ports will be more available for memory access. Further, buses typically used to communicate with specialized dedicated ports will not be needed with the programmable PIMs, increasing overall port operation speed and reducing latency. Even with bridges external to the MPMC, the PIMs allow a processor to communicate with peripheral devices on different buses while not slowing down remaining devices on a bus communicating with memory over the MPMC. The processor can simultaneously perform instruction reads from memory while communicating with other peripheral devices.

In further embodiments, the data path, address path and PHY interfaces of the MPMC are made highly configurable. In the data path, FIFOs according to embodiments of the present invention are alternatively formed from BRAMs, SRLs, LUT RAM or registers to accommodate different device parameters and operation speed. For example when a PLB typically requires a larger FIFO, a BRAM can be used, while a simple register can be used for an OPB. Further, operation speed at the front end can be adjusted to a different speed than the back end of the FIFO. In the address path, the addresses according to embodiments of the invention can be selectively multiplexed depending on the type memory used. For example, multiplexing can be provided with DRAM memory, and eliminated with SRAM where it is not usually required. Further, the address size can be dynamically adjusted. If an overlap between addresses of two ports occurs, in one embodiment addresses can be semaphored for protection or separation to prevent collisions. In another embodiment, aliasing of addresses can be provided so that when address size is adjusted, the physical addresses do not overlap. For the PHY interface, rather than a fixed device with registers and clocking, the PHY interface according to the present invention is parameterized to align with different memory device types. Instead of using a state machine to read a data address strobe (DAS), embodiments of the invention use logic to read and write a header, payload and footer of data words, compare the values, and adjust input data delays to provide precise data alignment relative to the clock.

In still further embodiments of the present invention, intelligent pipelining is provided to allow control over a variety of pipeline stages in order to permit a customer to trade off FPGA area for maximum frequency performance. The pipelines can be optionally added for each port internal to the MPMC. In one example, the optional pipeline is used between the arbiter and control state machine of the MPMC for each port. The locations of these optional pipelines and their ability to be controlled on a per port basis, achieves greater flexibility and performance.

The MPMC implemented using an FPGA can be programmed in some embodiments through a Graphical User Interface (GUI). The various embodiments of the GUI offer advantageous control over creation of prior MPMC-based systems. First, the GUI allows creation of multiple cores of a system rather than a single core, with an MPMC set to connect the core devices to a particular memory. The GUI can be data driven from user editable text files, and it can offer feedback on resource utilization, area, performance estimates, and performance measurements. It can provide performance feedback estimates based upon the current programmable settings for each port. The GUI can further provide performance data measured for the system back to the user. The GUI can intelligently set the arbitration of the system in such a way as to maximize system performance based upon the measured data. Further, the GUI can use the information entered to dynamically create an entire core for the MPMC and peripherals and processors on board the FPGA, and provide intelligent design rule checking both as information is being entered, as well as during operation when the GUI dynamically creates complex hardware.

In still other embodiments, performance monitors (PMs) can be embedded within the MPMC to provide measurement of various aspects of performance. The measurements can be aggregated together to provide historical information. Additionally, the information collected can be used to dynamically alter the arbitration or any other relevant adjustable parameter within the MPMC. In one embodiment, the PM provides the performance measurement to an external agent for later additional processing and/or summarization.

BRIEF DESCRIPTION OF THE DRAWINGS

Further details of the present invention are explained with the help of the attached drawings in which:

FIGS. 11A-B illustrate how address overlap, aliasing, offsetting and replication can be implemented according to embodiments of the present invention;

FIGS. 13-17 provide screen shots of a GUI demonstrating an example GUI according to embodiments of the present invention.

DETAILED DESCRIPTION MPMC Overview

Figure 2:
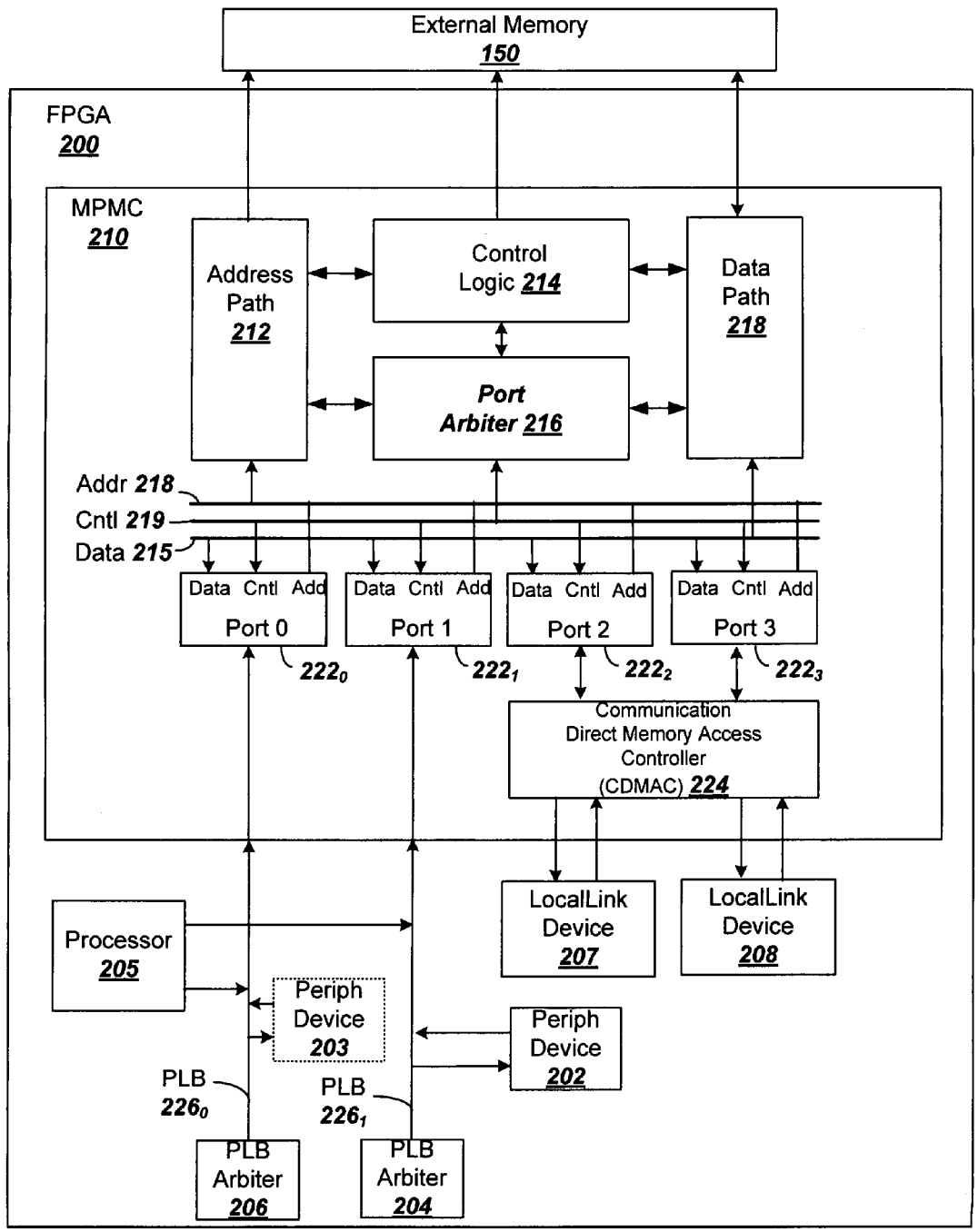
FIG. 2 is a block diagram depicting an FPGA configured as a multi port memory controller.

FIG. 2 is a block diagram depicting an exemplary FPGA 200 configured as a multi-port memory controller (MPMC) 210. The MPMC 210 includes general ports $222_0$ through $222_3$ (collectively referred to as ports 222). MPMC ports 222 may be connected to peripherals by a system bus, such as Processor Local Buses (PLBs) $226_0$ and $226_1$. Processor 205 and other peripheral devices 203 and 202 are shown connected to ports $222_0$ and $222_1$ by PLBs $226_0$ and $226_1$. PLB arbiter 206 provides bus arbitration for the peripherals on bus $226_0$, while PLB arbiter 204 provides arbitration for bus $226_1$. A communication direct memory access controller (CDMAC) 224 can provide a LocalLink to devices 207 and 208 over other ports, such as ports $222_2$ and $222_3$. An example of a LocalLink device is a Gigabit Ethernet Media Access Controller (GEMAC). The CDMAC 224 has ports configured to communicate with the devices 207 and 208 over a non-shared interface (e.g., a streaming interface to a direct memory access DMA port).

The ports 222 are pre-configured with I/O paths capable of communicating with the various types of buses or point-to-point interfaces. Notably, each of the I/O paths of ports $222_0$-$222_4$ include a data path interface (Data) 215, a control bus interface (Cntl) 219, and address bus interface (Addr) 218. The MPMC further includes port arbitration logic 216, data path logic 218, address path logic 212, and control logic 214. The data path logic 218 includes an interface to the data path interface 215 and to the memory 206. The address path logic 212 includes an input interface coupled to the address bus 218 and a memory interface coupled to external memory 150. The port arbitration logic 216 includes an interface coupled to the control bus 219, an interface coupled to the control logic 214, an interface coupled to the data path logic 218, and an interface coupled to the address path logic 212. The control logic 214 includes a memory interface coupled to external memory 150, an interface coupled to the data path logic 218, and an interface coupled to the address path logic 212.

In operation, the port arbitration logic 216 executes a fixed arbitration algorithm to select one of the ports 222 for access to the memory 150. Notably, a plurality of the ports 222 may provide memory transaction requests to the port arbitration logic 216 simultaneously. The port arbitration logic 216 analyzes all pending transaction requests and provides a request acknowledgment to one of the ports 222 in accordance with the fixed arbitration algorithm. The port that "wins" then obtains access to external memory 150 and the requested memory transaction is performed. The port arbitration logic 216 provides port select data to each of the address path logic 212, the data path logic 218, and the control logic 214. The port select data includes the identity of the selected one of the ports 222. The address path logic 212 receives an address context from the selected one of the ports 222 using the port select data. Likewise, the data path logic 218 receives a data context from the selected one of the ports 222 using the port select data.

After granting a transaction request from one of the ports 222, the port arbitration logic 216 provides a memory transaction request to the control logic 214. The control logic 214 processes the memory transaction request and determines a sequence of sub-transactions required to perform the desired memory transaction. Each of the sub-transactions comprises a sequence of memory operations for causing external memory 150 to perform a particular action. Thus, each memory transaction includes a sequence of memory operations.

The control logic 214 drives the data path logic 218, the address path logic 212, and external memory 150 with control signals that execute memory operations in external memory 150. The data path logic 218 drives external memory 150 with data needed to perform the memory operations indicated by the control signals from the control logic 214. Likewise, the address path logic 212 drives external memory 150 with addresses needed to perform the memory operations indicated by the control signals from the control logic 214. The end result is that the requested memory transaction provided by the arbitration logic 216 is performed. The control logic 214 provides a complete signal to the port arbitration logic 216 to indicate when another memory transaction may be issued. In the example of FIG. 2, hardware is custom built for a four port MPMC using PLB interfaces for ports $222_0$ and $222_1$ and CDMAC interfaces for ports $222_2$ and $222_3$. The example of FIG. 2 further lacks a changeable PHY interface between external memory 150 and logic of the MPMC to enable communication with different forms of memory. Further, a means to customize all of the elements, such as through a Graphical User Interface (GUI), is not provided.

Figure 3:
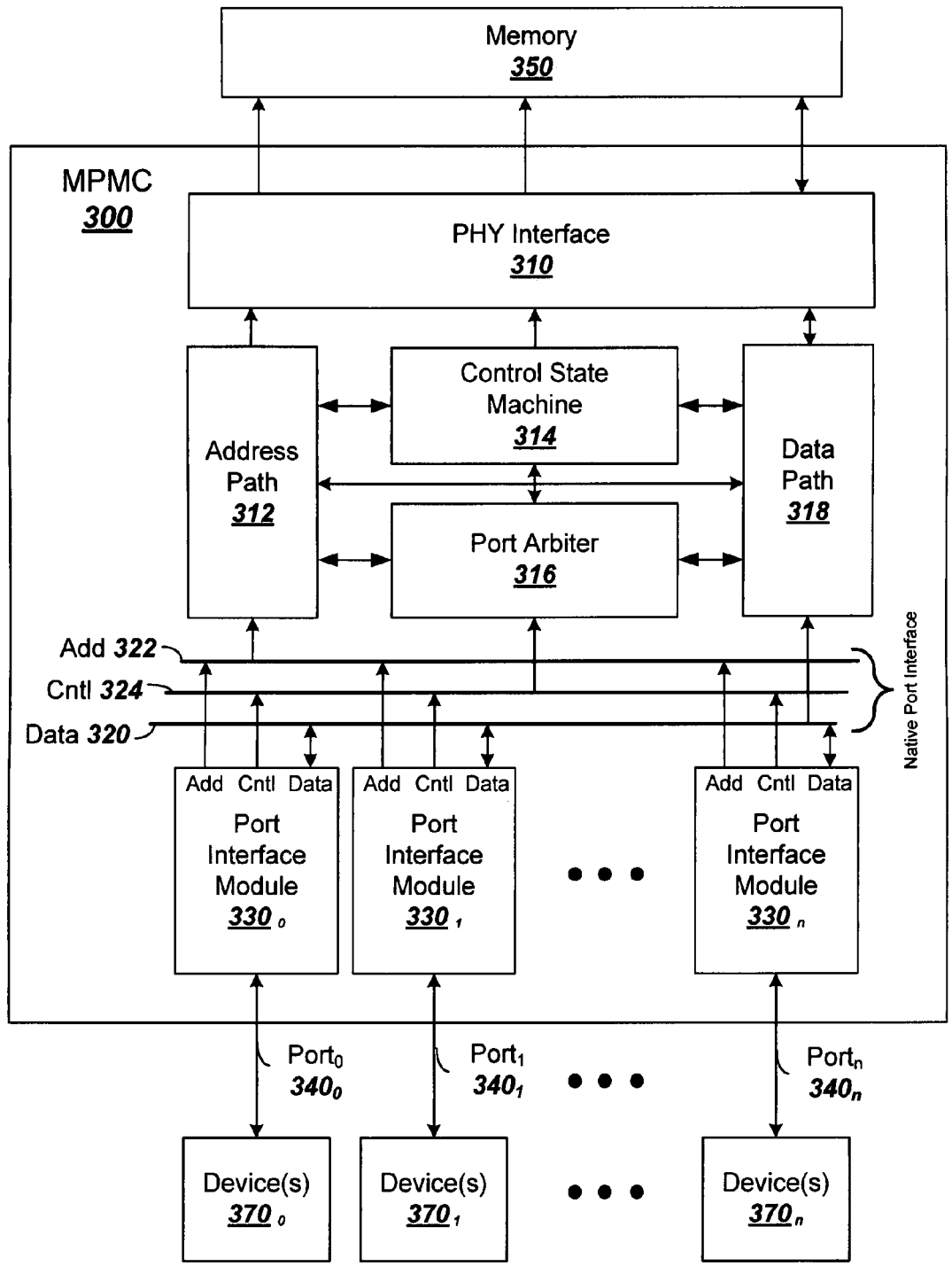
FIG. 3 shows a block diagram of an MPMC constructed in accordance with one or more embodiments of the invention.

FIG. 3 shows a block diagram of an MPMC 300 showing components constructed in accordance with one or more embodiments of the invention. FIG. 3 demonstrates the application of a changeable number of ports labeled $340_0$-$340_N$ to range from 0 to N, rather than the fixed four ports $222_0$-$222_3$ shown in FIG. 2. Using a variable number of ports $340_0$-$340_N$ is advantageous because it allows a designer to begin with an existing design and morph the system topology to use more ports and improve performance over time.

The ports $340_0$-$340_N$ are further connected to Port Interface Modules (PIMs) $330_0$-$330_N$, illustrating that each port is changeable in what it can do, relative to the fixed type ports $222_0$-$222_3$ of FIG. 2. The PIMs $330_0$-$330_N$ are shown connected to devices $370_0$-$370_N$. Rather than being confined to specific types of peripherals or buses, or requiring use of a CDMAC, as in FIG. 2, the configurability of the PIMs $330_0$-$330_N$ allows various components to be attached as the devices $370_0$-$370_N$. For convenience, the PIMs will be collectively referred to herein as PIMs 330. While this diagram shows the devices in a point-to-point configuration, many other configurations are possible, some of which are illustrated through subsequent figures. How a specific configuration is connected represents the 'topology' of the system built with the MPMC 300.

In addition to the ports $340_0$-$340_N$ that provide an interface to components external to the MPMC, the memory controller 300 of FIG. 3 further includes a physical (PHY) interface 310 to connect to various memory devices, labeled as memory 350. The PHY Interface 310 is added to demonstrate the changeable nature of the interface, described in more detail subsequently, that is provided to connect with the different memories. The memory 350 is indicated without reference to whether the memory is internal or external, in contrast with FIG. 2 that specifically references an external memory. The memory 350 can be provided within the FPGA chip, or external to the FPGA, and is not confined to the external memory device as in FIG. 2. The memory 350 can further take various forms, for example the memory 350 can be a Dynamic Random Access Memory (DRAM) device, Static RAM (SRAM), Double Data Rate (DDR) DRAM, or other type of memory device known in the art. The memory 350 can further be internal BRAM included as part of the FPGA itself. The memory 350, FPGA 102, and various other devices, whether internal or external to the FPGA, may be integrated onto a single chip to form a single system-level integrated circuit (referred to as a "system-on-a-chip" or (SoC)).

Similar to the address path logic 212, control logic 214, arbiter 216 and data path 218 of FIG. 2, the memory controller of FIG. 3 includes a different address path 312, control state machine 314, port arbiter 316, and data path 318 respectively. Also, similar to buses 215, 218 and 219 of FIG. 2, the topology of FIG. 3 includes a data bus 320, address bus 322 and control bus 324. Address path logic 312 receives address signals from ports $340_0$-$340_N$ via Port Interface Module (PIM) $330_0$-$330_N$. Data path logic 318 includes bi-directional FIFOs between PIMs 330 and memory 350, via PHY interface 310. Data written to FIFOs of data path logic 318 is provided to the physical (PHY) interface 310 for sending to memory 350 once data from the port is selected for transmission. Similarly, data received from memory 350 is returned through PHY interface 310. Additional features of these new components are described in detail below. In sum, the versatility of the components illustrated in FIG. 3 provide a significant advantage over prior memory controllers, as can be appreciated by the remainder of this specification.

Figure 4:
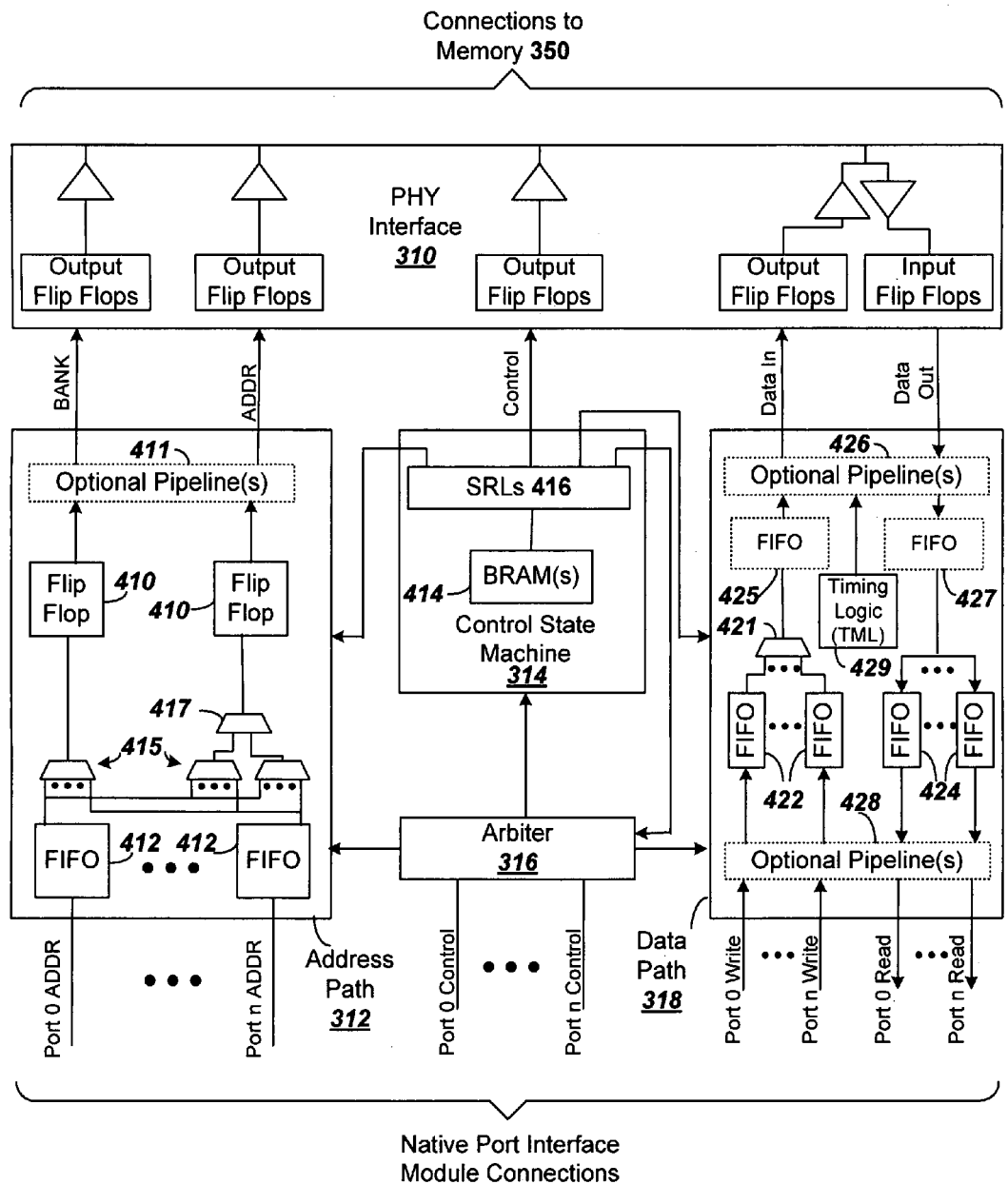
FIG. 4 shows a block diagram of the internal construction of an MPMC in accordance with one or more embodiments of the invention.

FIG. 4 shows further details of the memory controller of embodiments of the present invention. The arbiter 316 receives control inputs provided from PIMs $330_0$-$330_N$. The arbiter 316 analyzes all pending transaction requests from the PIMs $330_0$-$330_N$ and provides port select data indicating which port was granted access. One embodiment of an arbiter that can be used in conjunction with the present invention is described in U.S. patent application Ser. No. 11/341,003, referenced previously.

The control state machine 314 receives the control information from arbiter 316 and includes circuitry to look up control data needed in BRAM 414. The control signals from BRAM 414 are provided through SRLs 416 to the address path logic 312, data path logic 318, and through a physical (PHY) interface 310 to memory 350. The control signals from the SRLs 416 of the control state machine 316 include port select data that identifies the selected port that will transmit data. The address path logic 312 receives an address context from the selected one of the ports. Likewise, the data path logic 318 receives a data context from the selected port.

After granting a transaction request from one of the input ports, the port arbitration logic arbiter 316 provides a memory transaction request to the control state machine logic 314. The control state machine 314 processes the memory transaction request and determines a sequence of sub-transactions required to perform the desired memory transaction. Each of the sub-transactions comprises a sequence of memory operations for causing the memory to perform a particular action. The control state machine logic 314 drives the data path logic 318, the address path logic 312, and the PHY interface 310 with control signals directed to the memory 350 to execute memory operations. The data path logic 318 and address path logic 312 also drive the PHY interface 310 with data and address signals to perform the memory operations indicated by the control signals from the control state machine logic 314. The end result is that a requested memory transaction provided by the port arbitration logic arbiter 316 is performed.

Self Aligning State Machine

Figure 5A:
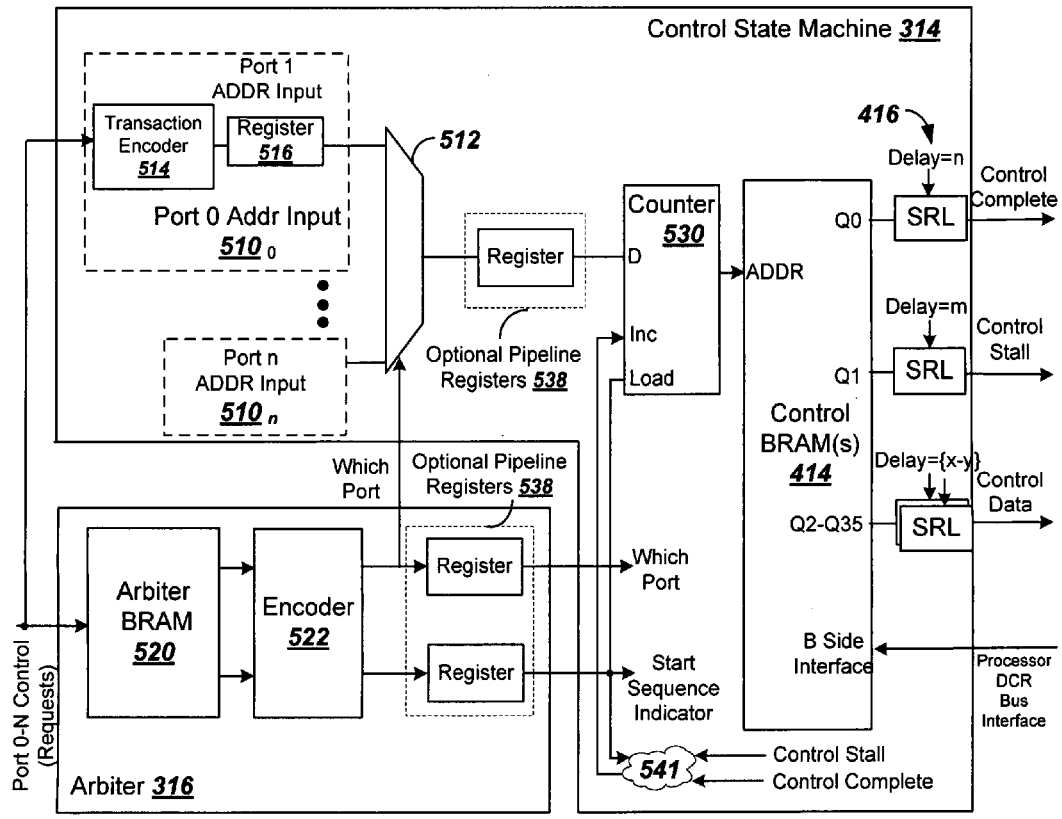
FIG. 5A shows components of a port arbiter and control state machine within the MPMC of FIG. 3 and FIG. 4 in accordance with one or more embodiments of the present invention.

FIG. 5A shows additional details of the arbiter 316 and control state machine 314 of FIGS. 3 and 4. The arbiter 316 in one embodiment includes an arbiter BRAM 520 that receives request control signals from the ports 0-N connected to the memory controller. The appropriate port sequence is selected by a signal provided from the arbiter BRAM 520 that provides a signal indicating "which port" is selected through encoder 522 to optional pipeline 538 and to a multiplexer 512 of the control state machine 314. The arbiter 316 also provides a start signal through the optional pipeline 538 once a port is selected, and the "start sequence indicator" is then provided to the control state machine 314. A "Load" signal is likewise provided from the arbiter once an indication is received that the previous port access has been completed, in order to start the next memory transaction, if present.

In the control state machine 314, each of ports 0-N has an assigned port address input module $510_0$-N. The port 0-N address modules $510_{0-N}$ each include a transaction encoder 514 that chooses which sequence will be used in control BRAM 414. The transaction encoder 514 provides a start address based upon the transaction type requested by the port. The start address is provided to register 516 and then to multiplexer 512. Multiplexer 512 selects 'which port' is to be granted access from arbiter 316, and then provides the selected start address through optional pipeline register 538 to counter 530. Counter 530 then loads the start address when arbiter 316 tells it to do so. This then begins the sequence of operations to the memory. More details of the arbiter, particularly on how sequences are stored and selected for individual ports, is described in U.S. patent application Ser. No. 11/341,003 referenced previously.

The BRAM 414 of the control path state machine 314 can have contents set to any number of values to permit any kind of control that a user requires. The state machine BRAM 414 provides information with several output paths that control the data path logic 318, address path logic 312 and PHY interface 310 as shown and described with respect to FIGS. 3 and 4. The sequence of memory transactions from port arbitration logic arbiter 316 of FIG. 5 are used by control state machine 314 to control a memory transaction stored in BRAM 414. Outputs of control BRAM 414 are provided from the controller through shift register look up tables (SRLs) 416. The SRLs 416 shown include separate registers to provide a signal 'Control Complete' from output $Q_0$, 'Control Stall' from output $Q_1$, and the 'Control Data' from outputs $Q_2$-$Q_{35}$. The initial address input to the BRAM 414 from counter 530 is used to set the initial sequence state of the state machine, as described previously.

The basic function of the control state machine 314 is to play sequences of events. The BRAM control path in control state machine 314, in one exemplary embodiment can allow up to 16 sequences. The sequences can include: (1) word write, (2) word read, (3) 4-word cache-line write, (4) 4-word cache-line read, (5) 8-word cache-line write, (6) 8-word cache-line read, (7) 32-word burst write, (8) 32-word burst read, (9) 64-word burst write, (10) 64-word burst read, (11) No operation (NOP), (12) Memory refresh, and (13) Memory initialization.

With the memory 350 being DDR2, DDR, SDRAM, and potentially other types that are driven by a memory controller, the read and write sequences can be divided into three stages: activate, read or write and precharge. Each of these stages has specific sequences of events to the data path 318, address path 312, PHY interface 310, and the arbiter 316 of FIG. 3. The sequences vary depending on the memory type (e.g., DDR2, double data-rate (DDR) Dynamic Random Access Memory (DRAM), a single data rate DRAM, or Synchronous DRAM (SDRAM)), memory style (e.g., discrete parts, unbuffered DIMM, or registered DIMM), memory configuration (number of bank, row and column address bits), PIM configuration (e.g., ISPLB PIM, DSPLB PIM, PLB PIM, OPB PIM, XCL PIM, CDMAC PIM, and/or NPI PIM), and clock frequency. The control state machine 314 of FIGS. 3, 4 and 5A can be configured to support any of these options because the contents of the BRAM 414 can be modified and the SRLs 416 have configurable delays. The SRLs 416 of the control state machine 414 connect, as illustrated in FIG. 4, partly to the PHY interface 310 to further make it easy to change the MPMC system in order to make it compatible with different types of memories. The PHY interface 310 is described in more detail subsequently.

Counter 530 generates an address for the BRAM 414 and is used to play a sequence of events from BRAM 414. One of the port O-n ADDR inputs $510_{0-n}$ determines the base address of the selected sequence and is loaded into counter 530. The arbiter 316 contains a prioritized list of port numbers that have access to the control path BRAM state machine 414. Arbiter 316 will look at which ports are requesting access to the state machine and will determine when a new sequence will start and will send the 'Start Sequence Indicator' to load counter 530. Additionally, arbiter 316 will present the selected port to the address and data path via the 'Which Port' signal. The SRLs 416 provide output words that can be individually delayed by static and/or dynamic control in order to control different functions.

After a sequence is begun to access BRAM 414, in every clock cycle the address increments by one unless the sequence calls for a stall (Cntrl_Stall) or until the sequence has finished and the state machine is ready to accept the next sequence. Each sequence continues until (Cntrl_Complete) is received from one of the SRLs 416 indicating the sequence has finished and the state machine is ready to accept the next sequence. The Cntrl_Stall and Control_Complete signals are provided as feedback through logic 541 to provide an increment (Inc) input to counter 530 to control and hold the state of counter 530 for a specified time until a sequence is complete. Once a sequence is indicated to be complete, the start sequence indicator 'load' signal can be provided from the arbiter 316 to indicate that a new sequence base address can be loaded and the next sequence can begin. Although Cntrl_Stall and Cntrl_Complete are illustrated and described, they show one embodiment for implementation of the system and are not specifically required. For example, the sequences could have a fixed length and timing or the high address in the sequence could be used to determine when an operation is complete. It can be appreciated by one of ordinary skill in the art that other types of control signals may be possible and that the above description is provided with the intent to illustrate the concepts.

In one embodiment, the contents of the BRAM 414 can be read or written over a Device Control Register (DCR) bus. A processor included in the MPMC system with a DCR interface can, thus, be used to read and write the contents of the BRAM 414. As illustrated, processor signals are provided over the DCR bus to a B-side interface of BRAM 414. The DCR effectively provides an auto-incrementing keyhole register access to the BRAM 414, as described later. Note as well that the same DCR interface shown in FIG. 5A could also be attached to arbiter BRAM 520 within arbiter 316.

Figure 5B:
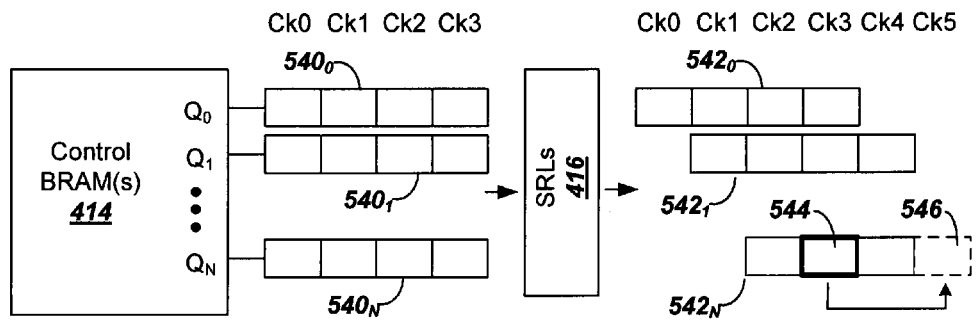
FIG. 5B illustrates the function of the SRLs of FIG. 5A with variable delays set and data elements shifted.

FIG. 5B illustrates the function of the SRLs 416 with programmable delays. According to embodiments of the present invention, the SRLs 416 are controllable to provide different delays depending on the memory device(s) attached. Each SRL 416 has a delay parameter that can be set on a per-output basis. The delay parameter indicates the number of cycles that the BRAM data output should be delayed. If the parameter is set to zero, the SRL is bypassed. In some embodiments a register is added to the SRL 416 outputs in order to greatly improve timing within the MPMC.

In operation as shown in FIG. 5B, the outputs $540_0$-$540_N$ of the Control BRAMs 414 are aligned with clocks Clk0. This may not be compatible with an attached memory. The SRLs 416 allow delayed staggering of the data outputs $542_0$-$542_N$. The delay may be fixed at programming of an FPGA used to create the MPMC, or dynamically during memory operation. As shown in FIG. 5B, outputs $542_0$-$542_N$ are no longer aligned relative to Ck0.

In one embodiment, the dynamic ability of the SRLs 416 is used to allow for altering the order of the content coming from control BRAM 414. Through the use of multiple SRLs 416 (not shown) per control BRAM 414 bit, and with the application of dynamic multiplexing logic (not shown), data bits are allowed to be effectively altered in the output. Bits are altered rather than simply delaying bits before data is sent to the PHY interface. For example, bit 544 can be swapped for bit 546, as illustrated in FIG. 5B.

Each SRL 416 can be individually and dynamically adjusted as needed to provide appropriate delays. The control over the delay may be static and remain unchanged while the SRL 416 is in operation. It may also be dynamic in that other logic within the MPMC may alter the number of cycles that each individual SRL 416 delays in order to accomplish a specific purpose. Those skilled in the art will understand the value of being able to dynamically delay the outputs of the BRAM 414.

Port Interface Modules (PIMs)

Overview

FIGS. 6A-6B, 9 and 10 illustrate how some embodiments of the present invention include Port Interface Modules (PIMs) that are versatile to allow decoupling of individual ports from a particular type of attached devices, processor or buses. The PIMs can include programmable logic forming a "bridge" that can be programmed to translate from one of a multiplicity of interfaces to enable compatibility with a particular type of processor, device or bus. Further, bridges can be provided within a PIM to enable bridging of signals entirely within the MPMC from one port to another port where the PIM is programmed to be compatible with that particular device. The structure and location of these bridges allows for the wealth of different system topologies. The PIMs can create high performance systems due to the way they allow transactions to be offloaded from various devices that wish to communicate with memory. Further, the bridges allow a processor to communicate with peripheral devices directly or through different buses while not slowing down remaining devices on the bus(es) communicating with memory via the MPMC. The processor(s) are also enabled to simultaneously perform instruction reads from memory while communicating with other peripheral devices.

PIM Protocol Bridges

Figure 6A:
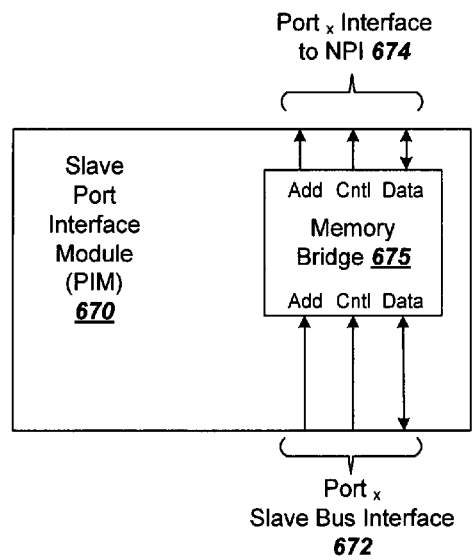
FIGS. 6A-6B are exemplary block diagrams of differing types of Port Interface Modules (PIMs), in accordance with one or more embodiments of the invention.
Figure 6B:
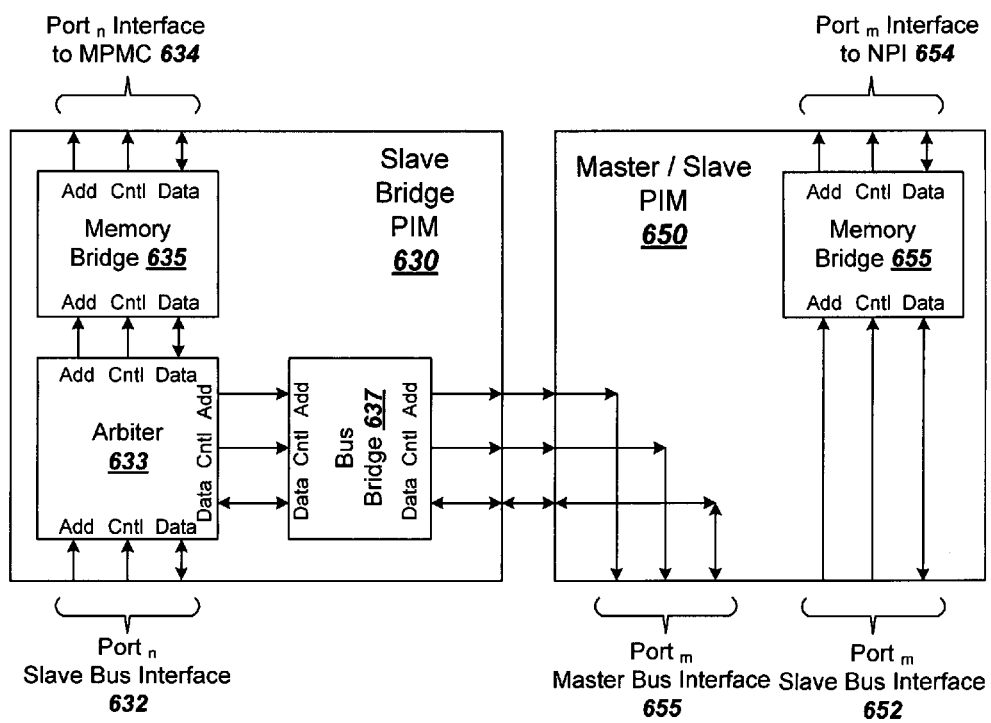

FIGS. 6A-6B show architectures for different classes of Port Interface Module (PIMs), according to embodiments of the present invention. In FIG. 6A, a slave PIM 670 illustrates an example PIM that contains just a slave bus interface 672 with an interface to Native Port Interface (NPI) 674 via a memory bridge 675. Memory bridge 675 provides any required change ("bridge") in protocol from the particular protocol on the slave bus interface 672 to the NPI 674 side to the MPMC. In some instances, there is no change in protocol and the PIM becomes a NPI PIM.

FIG. 6B shows another class of PIM, a slave bridge PIM 630 illustrating a modification from slave PIM 670. In slave bridge PIM 630, two additional elements are added, namely arbiter 633 and bus bridge 637. Arbiter 633 is not to be confused with port arbiter 316, nor with PLB arbiter 730 or OPB arbiter 740 in FIG. 7. The function of arbiter 633 is to simply allow the master's transaction on the slave bus interface 632 to be directed toward memory via memory bridge 635, or to one or more bus bridge 637 toward one or more master/slave PIM 650. The arbiter 633 need not be a complex arbiter; it could, for example, switch the transaction based purely upon address. One skilled in the art will appreciate that many methods exist for creating arbiter 633. Note that PIM 650 can also be used in a so-called 'master-only' mode where the slave bus interface 652 and NPI 654 remain unconnected. This provides slave bridge PIM 630 with the ability to communicate with slaves on master bus interface 655.

The bus bridge 637 is used, when requested, to provide the bus master from the slave bus interface 632 to generate master access via another PIM, such as the exemplary Master/Slave PIM 650. The provision of bus bridge 637 obviates the need for the significantly more complex bridge 750 and 760 as shown in FIG. 7B, and discussed subsequently. Further, the configuration with slave bridge PIM 630 permits the use of one or more bus bridges 637 within the same slave bridge PIM 630. Alternately, bus bridge 637 can itself be designed to communicate with multiple exemplary Master/Slave PIMs 650. It can be appreciated by one skilled in the art that the purpose of the bus bridge 637 is to provide-directed access for point-to-point connection on slave bus interface 632 to one or more other master bus interfaces 655 advantageously providing a mechanism to "bypass" traditional bus bridges without sacrificing the point-to-point system topology, performance loss, and area requirements. Further it can be appreciated that systems can be better graphically represented to users since an entire function moves inside a block, and provides a cleaner and clearer viewpoint of the resulting topology.

The master/slave PIM 650 is another example class of PIM. In this case, the master bus interface 655 is directly connected from Bus Bridge 637 through master/slave PIM 650 to master bus interface 655. It should be noted that master/slave PIM 650 could have additional logic contained within it between bus bridge 637 and master bus interface 655 as required by the application at hand.

One skilled in the art will understand that many different embodiments of PIMs other than those shown in FIGS. 6A-6B are possible. For example, a PIM could be a master-only PIM similar to master/slave PIM 650 but missing slave bus interface 652, memory bridge 655 and interface to NPI 654. Further, additional functions can be placed within a PIM to accomplish other purposes. For example, a Direct Memory Access Controller (DMAC) could be embedded within a PIM to enable the PIM to master traffic on is local master bus interface 655 from within the PIM, and couple such a transaction to interface to NPI 654. This exemplary PIM according to the present invention can be referred to as a CDMAC PIM.

MPMC Systems with Dedicated Bus Interfaces

Figure 7A:
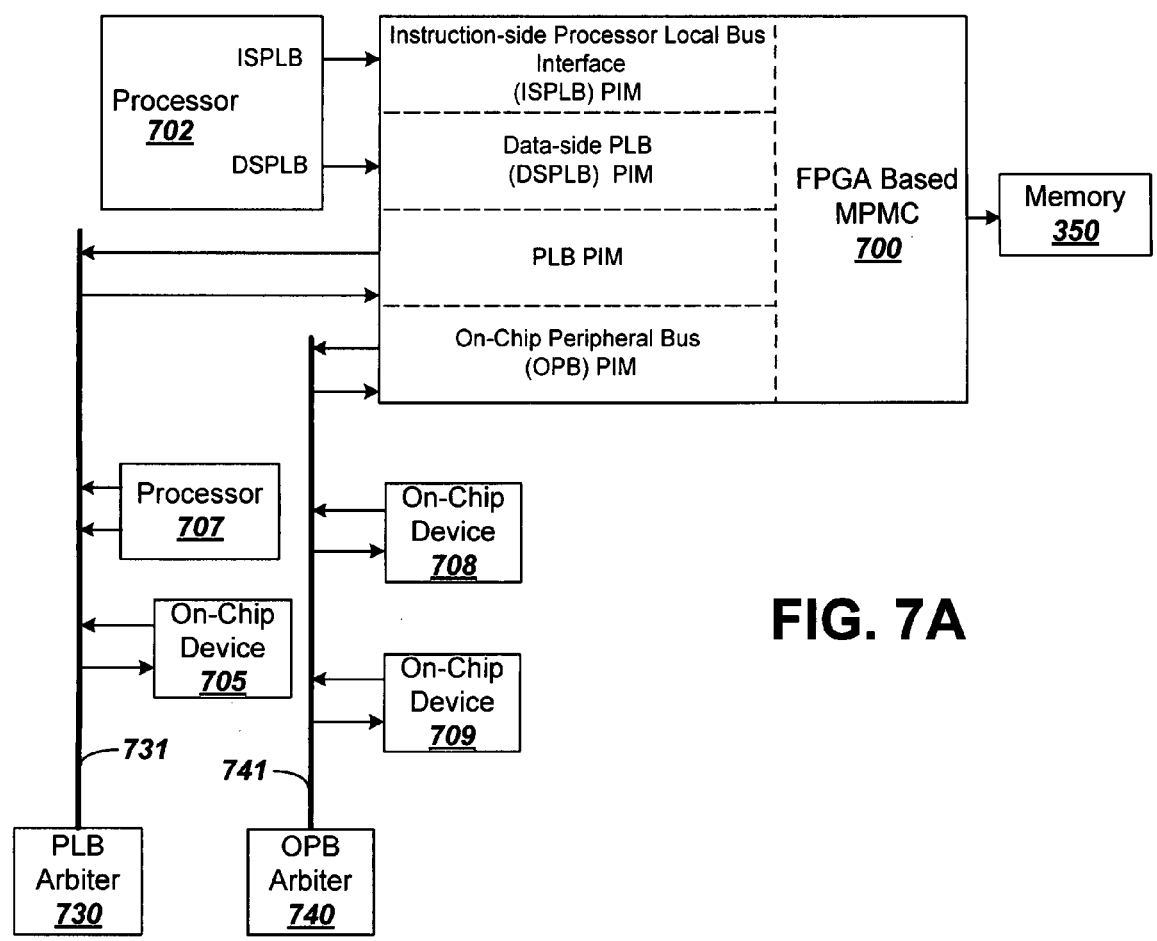
FIG. 7A is an example of conventional topologies of MPMC systems with processors, buses and other devices connected to single MPMCs.
Figure 7B:
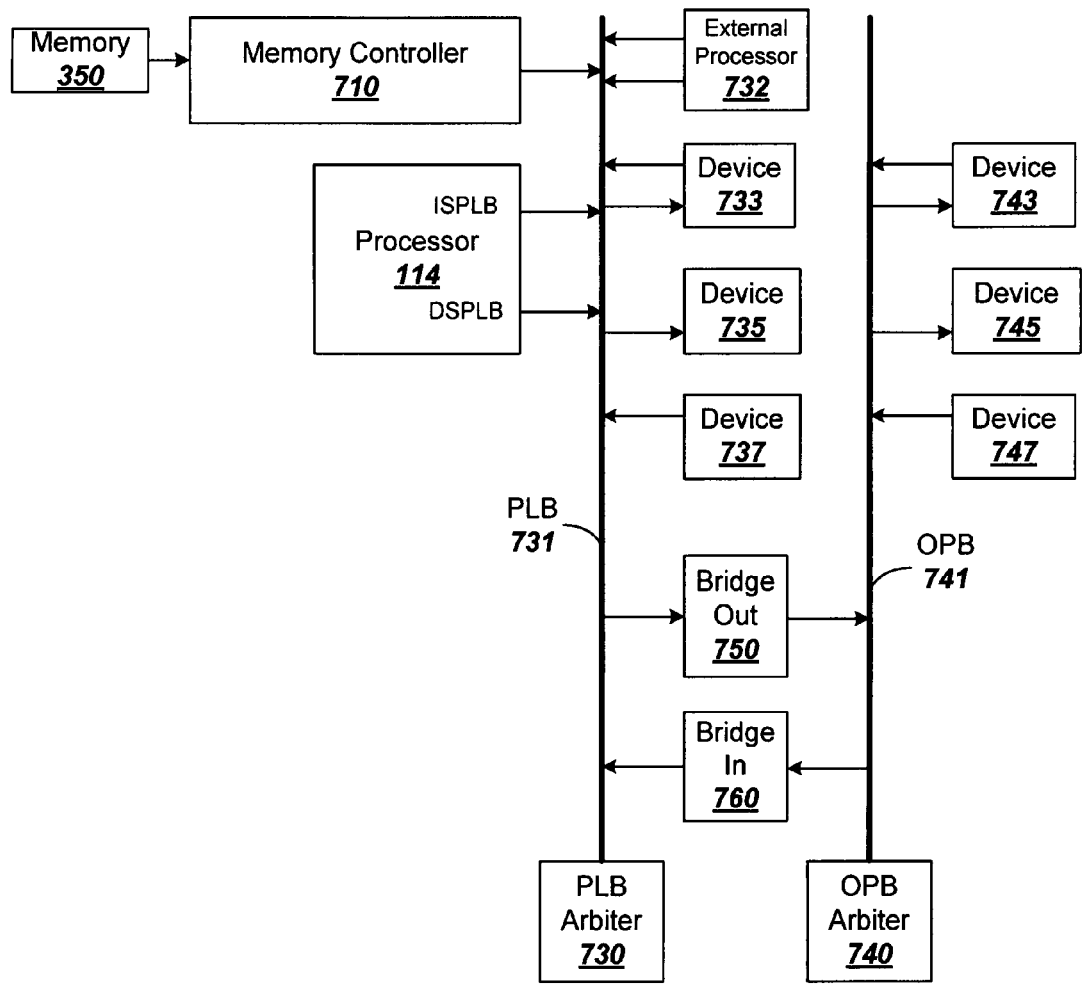
FIG. 7B is an example of a conventional topology system using a single port memory controller.

FIG. 7A shows a topology for a system including an MPMC 700 having ports connecting to devices such as processor 702, a Processor Local Bus (PLB) 731 and On-chip Peripheral Bus (OPB) 741. The MPMC 700 further connects to memory 350. The PLB 731 is shown connected to a PLB PIM at a port of the MPMC 700 and supports a processor 707 external to the MPMC 700 as well as on-chip device 705. A PLB arbiter 730 arbitrates connection of devices, such as processor 707 and on-chip device 705, to the PLB 731. The OPB 741 is shown connected to an OPB PIM at a port of the MPMC 700. The OPB 741 supports on-chip devices 708 and 709 and has arbitration provided by OPB arbiter 740. Processor 702 is directly connected to two separate ports of the MPMC 700, one providing an instruction side PLB (ISPLB) and another providing a data side PLB (DSPLB). One skilled in the art will understand the exemplary nature of FIGS. 7A and 7B and that differing numbers of devices are possible within the topologies shown.

FIG. 7B illustrates an alternative MPMC system bus connection topology demonstrating a wide variety of devices that can be connected to the OPB and PLB buses illustrated generally in FIG. 7A to reduce the need for different MPMC port configurations. In this example topology, memory controller 710 is a single ported memory controller that interfaces to memory 350. The memory controller has a slave input from PLB 731. Processor 114 is a dual bus master on PLB 731. Similarly, an external processor 732 could be a single or dual bus master on PLB 731. This allows the MPMC to match existing shared bus systems and is an advantageous place to begin a system design prior to converting it to a multi-ported design.

Other devices 733, 735 and 737 are connected to PLB 731 to illustrate how various master/slave, slave only, or master only devices can be supported, respectively. Device 733 is an exemplary master/slave device. An example of device 733 could be a Gigabit Ethernet controller that contains a DMA engine to move data to and from memory 350 via memory controller 710. Device 735 is an exemplary slave only device. That is, it only responds to bus transactions from masters on PLB 731. An example of device 735 could be a high speed USB serial controller. Device 737 is an exemplary master only device. That is, it only initiates bus transactions to slaves such as memory controller 710 on PLB 731. An example of device 737 could be a Video Controller which only gathers data from memory 350 and displays it on a CRT or LCD screen.

In addition to the processors, devices, and memory controller 710, PLB 731 illustrates two example bridges that are conventional mechanisms to interconnect PLB 731 and OPB 741. The first, bridge out 750 allows the processors and other masters on PLB 731 to initiate transactions onto OPB 741 where slaves on OPB 741 can respond. The second, bridge in 760 allows master devices on OPB 741 to initiate transactions onto PLB 731, for example transactions to memory 350 via memory controller 710. These bridges are integral to this example system topology because they are the sole means for the masters on the buses to communicate with slaves on other buses. Devices 743, 745 and 747 are analogous to devices 733, 735 and 737, respectively, but are connected to a different protocol, in this case OPB 741.

PIM Embodiments of Invention

Figure 8:
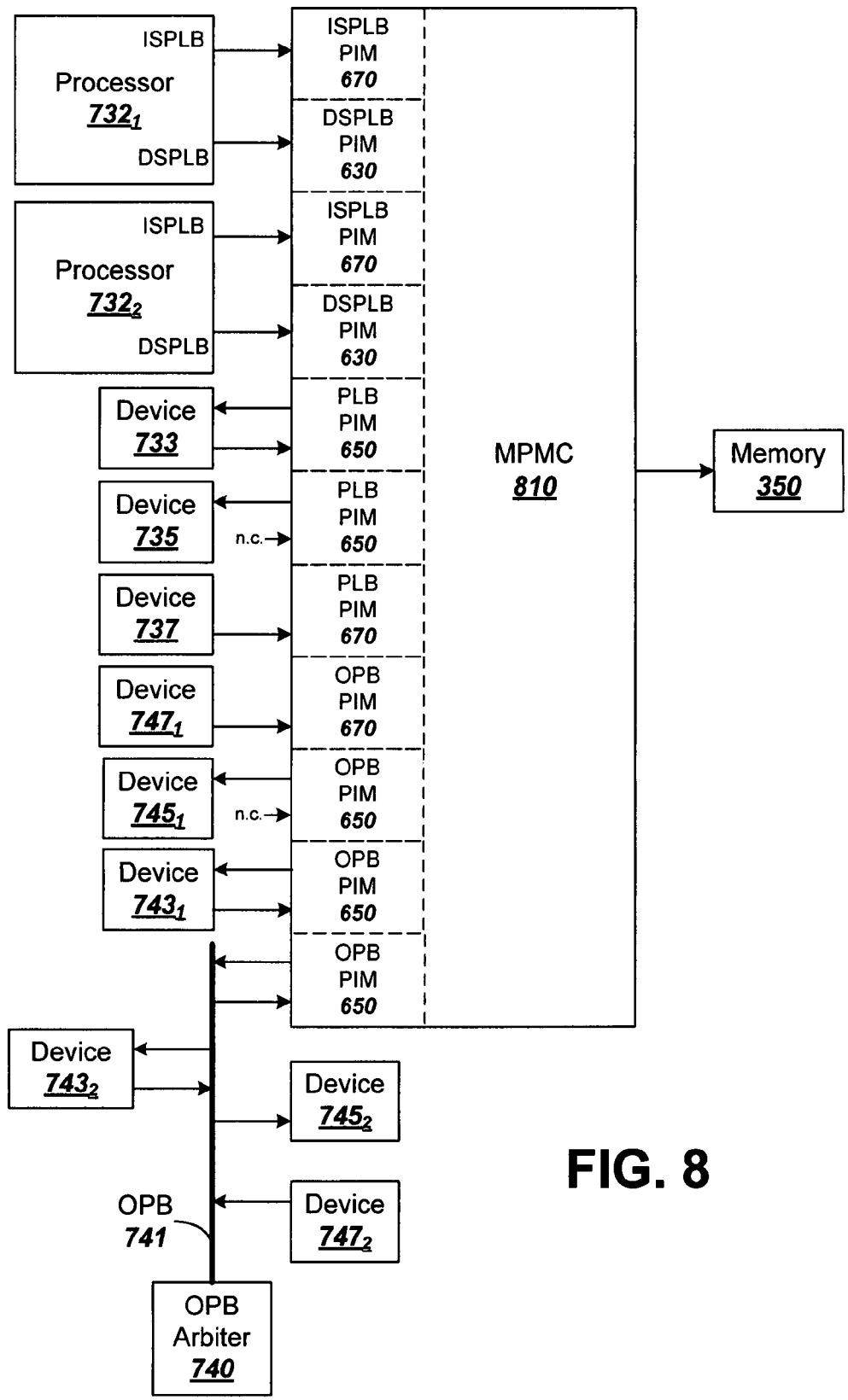
FIG. 8 shows an example topology of a system with multiple processors, multiple buses and multiple devices using an MPMC in accordance with one or more embodiments of the invention.

FIG. 8 illustrates an exemplary MPMC system topology illustrating how embodiments of the present invention can overcome the inefficiencies of the dedicated interfaces of FIGS. 7A and 7B. In particular, FIG. 8 illustrates how uniquely programmable PIMs can eliminate the need for devices external to the PIMs that are used in FIG. 7B and allow for connection of different type devices directly to a port. With the arrangement of FIG. 8, a number of differing processors with potentially differing bus interfaces can be connected to the MPMC via the uniquely programmed PIMs. Further, whereas in a typical system as shown in FIG. 7B where the processors must share their connections to the bus, this embodiment of FIG. 8 illustrates the performance advantageous separation of the processor buses into separate PIMs of an MPMC.

FIG. 8 initially includes one or more processors $732_{1-2}$. The processors $732_{1-2}$ can be fixed devices, such as processor 114 or processor 124 described previously, or a soft processor such as processor 134 formed using FPGA logic. This illustrates the connectivity to MPMC 810 to one or more so-called "hard" processors (e.g., 114 and/or 124), one or more so-called "soft" processors (e.g., 134), and/or one or more external processors (e.g., 732). Note that it is not a requirement, and the processor(s) may also be connected to a single PIM, such as PIM 650, using an arbiter, such as OPB arbiter 740 over an OPB 741.

FIG. 8 also shows exemplary connectivity for the peripheral devices, such as devices 733, 735 and 737 used in FIG. 7B, to the unique PIMs in accordance with the present invention. The devices 733, 735 and 737 connect to individual PLB PIMs of slightly differing types instead of through an external PLB to a single PIM. The types are illustrated by a reference number label for the PIM indicating one of the different PIM configurations shown in FIGS. 6A and 6B. Devices 733 and 735 are shown connected to PLB PIMs of type Master/Slave PIM 650. Note that device 735 differs from device 733 in that it is only a slave type device. In this example, the Master/Slave PIM 650 would only connect the master port to the device, and the slave port would be left unconnected ('n.c.' in FIG. 8). Device 737 connects to a PLB PIM 670 of type slave only since the device 737 only masters transactions.

FIG. 8 further shows exemplary connectivity to PIMs for devices $743_1$, $745_1$ and $747_1$, shown connected to an OPB 741 in FIG. 7. This example also illustrates how devices $743_2$, $745_2$ and $747_2$ can still also be placed on an exemplary bus (OPB 741). Note that one device $747_1$ is directly connected to an OPB PIM of type Slave Only PIM 670, while the other device $747_2$ is connected via OPB 741 to a separate OPB PIM of type Master/Slave PIM 650. Similarly, there is one device $745_1$ connected directly to an OPB PIM and a second device $745_2$ connected via OPB 741 to an OPB PIM shared with the second device $745_2$. Additionally, the OPB 741 device $743_1$ is illustrated as connected to a master/slave style of PIM 650, while a similar device $743_2$ is connected through the OPB 741 to the OPB PIM 650.

A number of advantages can be appreciated from the FIG. 8 example embodiment over conventional systems such as that shown in FIGS. 7A-7B. First, multiple entities can simultaneously access an MPMC. Simultaneous MPMC access is enabled and performance is enhanced because entities are not required to access a single bus or small set of buses, enabling the performance of the system to be limited by memory controller performance instead of bus performance.

Second, by separating the individual entity connections to the MPMC into point-to-point connections, instead of a bus connection, clock frequency of the interface can be improved. In one embodiment, the clock performance of the processor is doubled in speed, improving from 100 MHz to 200 MHz.

Third, by separating the individual entities into point-to-point connections, the devices no longer interfere with one another. That is, in past systems, when devices shared the bus, they had to wait (latency) for access to the bus until other devices completed their access.

Fourth, embodiments of the present invention permit shared bus systems to still be created. The OPB 741 used in FIG. 8 illustrates this. Use of the system bus may be advantageous if a system designer is not as concerned about speed as opposed to using up available MPMC PIMs or increasing FPGA resource utilization.

As a fifth advantage, the example embodiment in FIG. 8 demonstrates the lack of bridge out 750 from FIG. 7B. Such bridge(s) are no longer needed with the new system topologies possible with embodiments of the present invention. Bus bridge out 750 is typically a large and complicated bridge because it has to handle many different types of transactions. Instead a comparable bridge is built into MPMC 810 of FIG. 8 specifically in slave bridge PIM 630 as bus bridge 637 as shown in FIG. 6B. This bridge is advantageously smaller than bridge out 750. The bridge formed in the PIM can run at higher clock frequencies because it can be made simpler than bridge out 750 as it has to respond to a smaller number of types of bus transactions.

As a sixth advantage, similar to elimination of bridge out 750, embodiments of the present invention enable elimination of the bridge in 760 shown in FIG. 7B. This is because typically neither bridge 760 nor 750 is needed with the new system topologies possible using embodiments of the present invention. Bus bridge 760 is typically used because devices on the bus slave side of the bridge 760 want to gain access to memory via the bus master side of the bridge 760. In the example of FIG. 8, the devices all have direct access to PIMs of the MPMC 810. This has the advantage of not requiring a change in protocol. Without a protocol change, clock performance is increased while latency is decreased.

As a seventh advantage, with embodiments of the present invention eliminating buses and their associated arbiter, arbitration will typically be done inside the memory controller and not within each possible bus. Memory controller performance can then improve because transactions can be more efficiently overlapped in the way that provides the highest possible data rate from the memory 350 using a single arbiter. In shared bus systems, the devices arbitrate for the memory on the bus, and thus the memory cannot take advantage of the parallel knowledge of what transactions are next.

As an eighth advantage, the ports according to embodiments of the present invention can operate at differing frequencies, which permits the ports to match the best operating frequencies of the devices attached. In a typical share bus system as illustrated in FIG. 7B, the devices attached to any given bus must operate at that bus clock frequency. Thus, if a particular device is very complicated and thus has a slow clock frequency, the whole bus is limited to running at the frequency of the slowest device on the bus. With individual PIMs according to embodiments of the present invention, instead each device can operate at its own preferential clock frequency and the whole system can improve in performance since faster devices can now operate faster.

Ninth, the arbitration in arbiter 316 in MPMC 810 is dynamically programmable, so the system performance can be modified as appropriate without the adverse effect of separate bus arbitration. For example, when the system is mainly using the processor(s) to execute code, a first arbitration algorithm can be used, whereas when devices are mainly communicating with memory 350, a second arbitration algorithm can be used that is more efficient for memory communication.

In sum, the structure and location of the bridges in a PIM allow for a wealth of different system topologies. They create high performance systems due to the way they allow transactions to be offloaded from various devices that wish to communicate with memory.

PIMs Forming NPI and CDMAC

Figure 9:
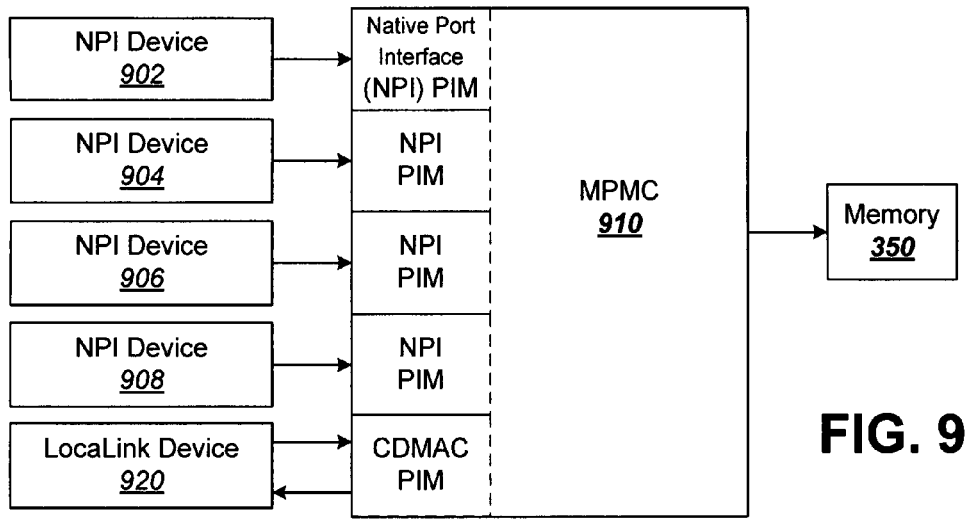
FIG. 9 illustrates an MPMC with PIMs configured to form Native Port Interfaces (NPIs) and a CDMAC according to embodiments of the present invention.

FIG. 9 illustrates an exemplary system topology wherein Native Port Interface (NPI) PIMs are provided in the MPMC 910. Note that this particular example does not show a processor connected. In some system topologies no processor is present, yet multiple devices still want to communicate with memory 350.

As indicated previously, with an NPI PIM, the PIM does not need internal logic to translate from the device or processor connected to the port to be compatible with the memory. The Native Port Interface (NPI) devices 902, 904, 906, and 908 can be any kind of device which requires access to memory and which utilizes the NPI protocol to communicate with memory. An example NPI device could be a Video CODEC that captures video from a video input device and sends the video data to memory 350 as well as outputs different video data from memory and sends the video data to a video output device. Since PIMs are programmable and not dedicated to a particular port type, more ports on an MPMC will be available for the typical NPI device as opposed to conventional systems without such dedicated non-NPI interfaces.

FIG. 9 also illustrates a Communication Direct Memory Access Controller (CDMAC) PIM that contains an embedded intelligent Direct Memory Access (DMA) engine optimized for communication style data access to memory. While most often DMA engines are controlled by processors, as can be appreciated by one skilled in the art, an intelligent DMA engine can be created which does not require a processor. One example usage of such an engine is to format conversion between one input video format and another output video format by properly moving data such that the NPI devices are provided correct data from memory.

An advantage of having DMA engines embedded within the PIMs according to some embodiments of the present invention is that the DMA engine alleviates either the processor or other devices from needing complicated internal DMA engines. The DMA engines can additionally offload the processor connected to its port to another port by directly doing so in a so-called "memcopy" function where memory is copied from one set of memory locations to another set of memory locations without requiring processor access to the memory to perform the copying. This saves significant processing cycles while also having substantially faster execution time to do the copy. In some embodiments, the memcopy function can be done within the PIM using much larger memory transactions than the processor can generate, which further reduces the amount of time the memory is 'busy'. By minimizing the time the memory is being used by the memcopy, even greater bandwidth is made available to other PIMs that want access to memory 350.

PIM Performance Monitor (PM)

PM Provided Inside PIM

Figure 10A:
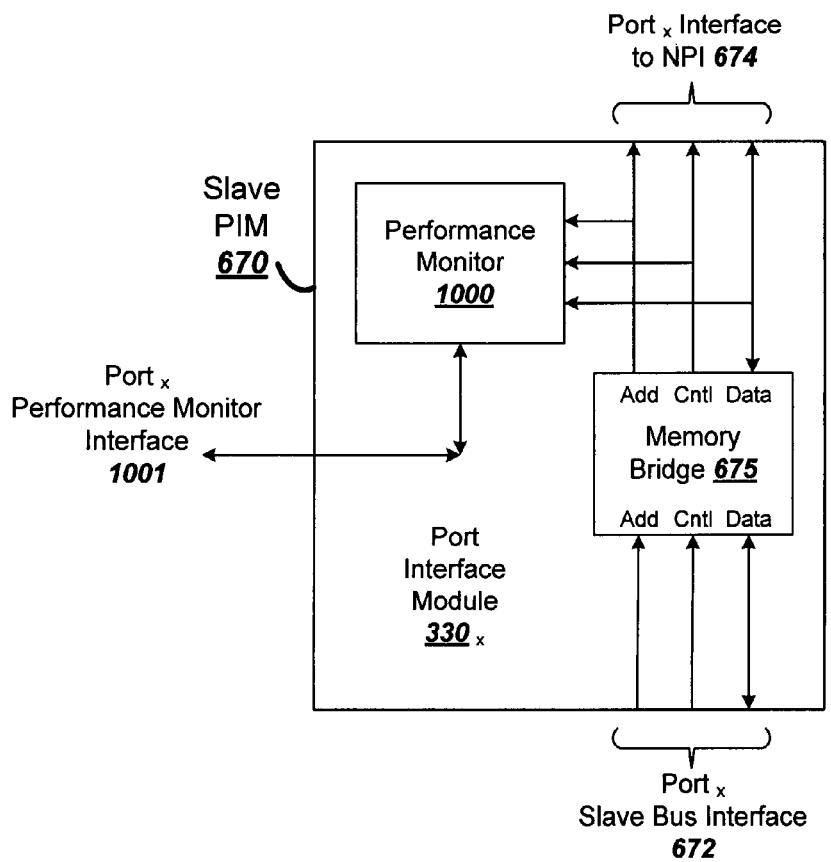
FIG. 10A shows a PIM including a performance monitor (PM) according to embodiments of the present invention.

FIG. 10A illustrates a Performance Monitor (PM) 1000 included in a PIM 330, illustrating how the PM 1000 can be connected. The PM 1000 allows the user to measure the performance of the transactions within the PIM 330. It can be appreciated that PM 1000 can be connected on the port interface to NPI 674 side of PIM 330 and/or on the Port Slave Bus Interface 672 side. The PM 1000 can be connected to other elements within PIM 330, as required by the PIM in order to measure what is desired.

In operation, the PM allows a system to view the performance of a port over time. The PM monitors each transaction and keeps a histogram of the execution time of each type of transaction, including separation for read and write access. The PM can perform a variety of measurements.

The Performance Monitor 1000 also has a per-port performance monitor interface 1001. The performance monitor interface 1001 is generally connected to a processor through a bus interface that is appropriate to that processor. However, it can also be connected to hardware that reads the performance monitor periodically to provide feedback control or other control to the system. In either case, performance monitor interface 1001 is intended as the means of reading and writing the relevant data captured by the performance monitor 1000.

In one embodiment of the present invention, the PM 1000 captures the transactions on the NPI 674 side of the PIM 330. For example, the PM 1000 can capture each byte read separately from each 16-bit word read. The PM 1000 counts how many clock cycles the transaction took to execute, and then accumulates the number of times this type of transaction has occurred at the measured number of clock cycles, providing a histogram of all the types of transactions of various execution times. It should be appreciated by one skilled in the art that many differing types of measurements are possible. For example, the PM 1000 could be built to measure the aggregate data rate on each side of the interfaces.

Since the PM 1000 contains a readable and writable performance monitor interface 1001, and the PM 1000 can be implemented on a per-port basis within the MPMC, the PM 1000 can also act as a control mechanism for dynamically settable parameters with a given PIM 330. That is, if a particular PIM requires some control functions such as setting up a dynamically adjustable base address, the PM 1000 provides a simple means to read or write registers within a given PIM 330 or anywhere else within the MPMC structure.

With a PIM having dynamically programmable arbitration and including per-port PMs, an advantageous dynamic selection of arbitration schemes can be performed. Either software or hardware within the arbiter 316 and control state machine 314 can automatically adjust the arbitration scheme based upon detected performance from a PM to maximize the system level performance.

PM Structure Provided Inside or Outside PIM

In some embodiments of the present invention, the MPMC can have PMs attached to various locations within the MPMC, yet outside the PIM, in order to measure some aspect of performance. For example, in many instances a user wishes to know how much data over how much time has been transferred to/from the memory 350. In one embodiment, the PM would measure the total number of bytes transferred to/from the memory 350 over a specific amount of time. In another embodiment, the PMs are used to measure the length of time that each type of transaction takes to execute. This information is accumulated in a memory within the PM and read out at a later time. By accumulating each type of transaction and the time each transaction time takes into separate 'buckets', the PM can contain the data of a histogram of the time each type of transaction takes. This information can be read from the PM's memory either via hardware that affects the state of the MPMC, or via hardware that communicates the information outside the MPMC for a computer or person to look at. It can be appreciated by those skilled in the art that many different types of measurements are possible, including directly measuring the memory 350. The PM then should be understood to not be limited exclusively to the domain shown in FIGS. 10A-10D, nor to the measurements described above. Any form of measurement can be stored in the PM's memory, and it is only requires logic structurally similar to that shown in FIG. 10B to produce the PM.

Figure 1:
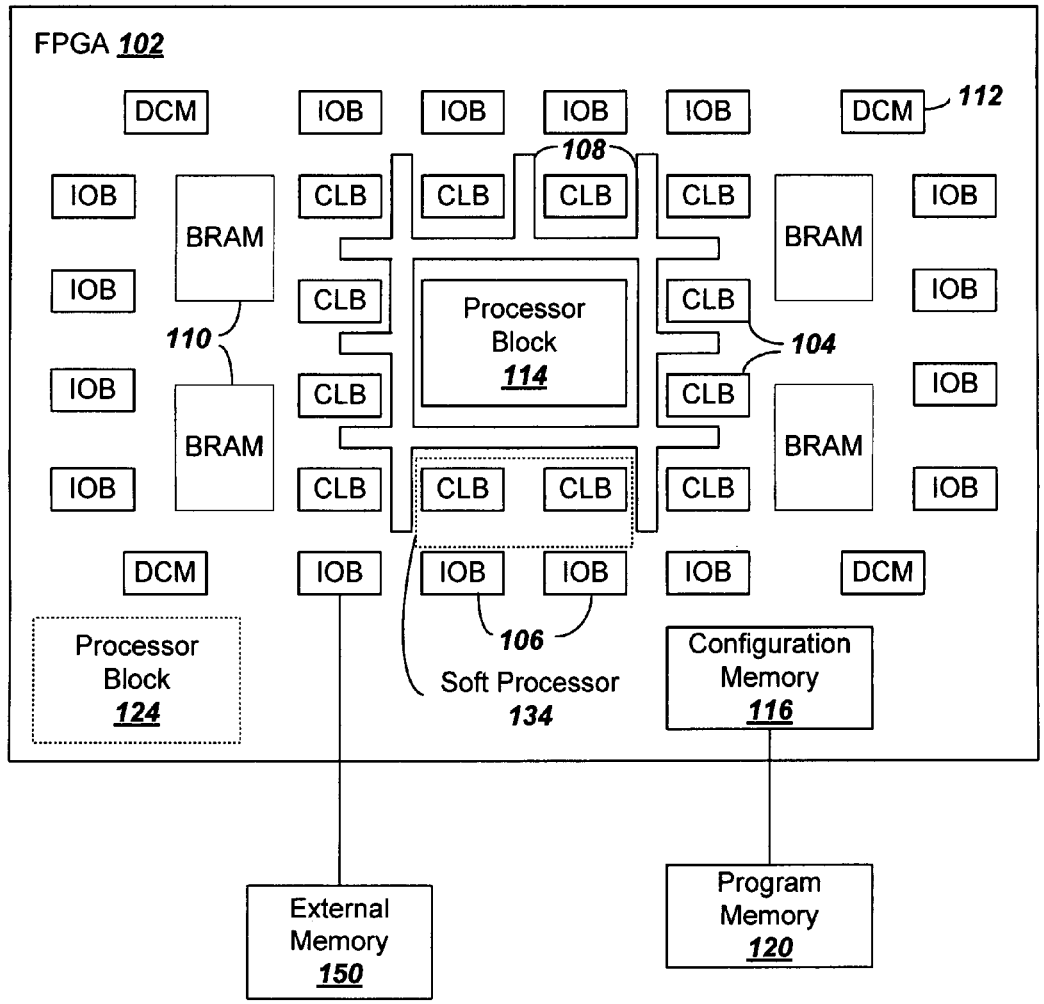
FIG. 1 is a block diagram depicting an exemplary embodiment of an FPGA coupled to external memory and a program memory.
Figure 10B:
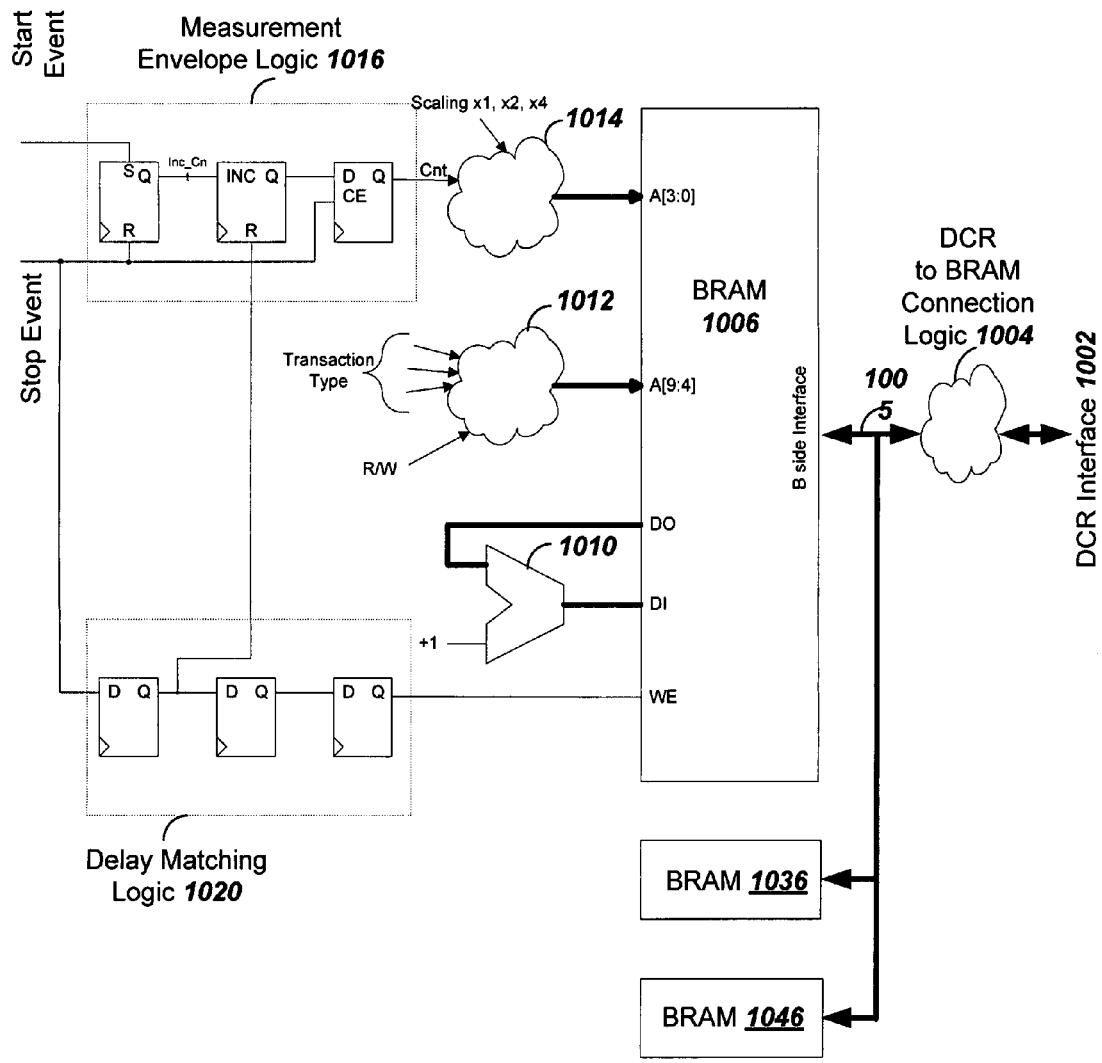
FIG. 10B is a block diagram depicting an exemplary embodiment of a PM.

FIG. 10B shows an exemplary block diagram to illustrate principles of creating performance monitors. BRAM 1006 is used to store the contents of the measured data. For example, BRAM 110 from FIG. 1 could be used to store the measured data. BRAM 1006 can be dual ported, as shown in FIG. 10B. One side of BRAM 1006 is used to input the measurements while the other side is made available for hardware and/or software to read and write the contents of the PM's storage element (e.g., BRAM 1006). It should be noted that a single ported memory could also be used if sufficient logic is added to share the port.

In one embodiment, the BRAM 1006 of the PM has a memory interface bus 1005 which can be coupled to DCR to BRAM connection logic 1004. It should be noted that in some embodiments, memory interface bus 1005 can be attached to one or more BRAMs, such as BRAM 1036 and/or BRAM 1046, which may or may not be contained within a PM or other part of the system. For example, memory interface bus 1005 could be attached to Control BRAM 414 as shown in FIG. 5A and/or arbiter BRAM 520, as well one or more performance monitors 1000 shown in FIG. 10. The DCR to BRAM connection logic 1004 is designed to translate the DCR Interface 1002 transactions into the transactions that BRAM 1006 can understand in order to read and/or write to BRAM 1006. It can be appreciated by one skilled in the art that any kind of interface could replace DCR Interface 1002 as a means to communicate with the BRAM 1006. For example, a hardware state machine could replace DCR to BRAM connection logic 1004 and provide feedback to arbiter 316 of FIGS. 3, 4 and 5A The PM's main purpose is to measure performance. In one embodiment, the performance measured is a histogram of the amount of time each type of transaction takes to execute. FIG. 10B demonstrates such an embodiment, though this example is provided to illustrate the major principles. Measurement envelope logic 1016 is used to keep track of how much time a given event is to be measured for. By the application of single clock cycle high pulses on the 'Start Event' and 'Stop Event' in sequence, an enveloping signal is created which is used to control a counter. The counter simply counts how many clock cycles have elapsed between the start and stop events. This information is then fed forward into lower order address management logic 1014. The count value, as well as scaling information is then used to determine which 'time bucket' within memory is to be chosen. Note that along with lower order address management logic 1014, the exemplary PM provides upper order address management logic 1012. Upper order address management logic 1012 is where the particular transaction type, along with whether the transaction is a read or a write is encoded to provide a unique 'transaction bucket'. In order to build a histogram, accumulation must take place. The accumulator logic 1010 serves the accumulation purpose by reading the data specified by the current address through the address management logic 1014 and 1012, accumulating it, and then writing it back to the same current address. This provides an additional registration of an event within the bucket specified by the combination of transaction bucket and time bucket. Using the scaling function of lower order address management logic 1014, the time bucket can be scaled, for example, allowing one bin to hold one and two clocks or one, two, three or four clocks of accumulation. While this results in lower granularity of time counted, it offers a larger view over all time.

Figure 10C:
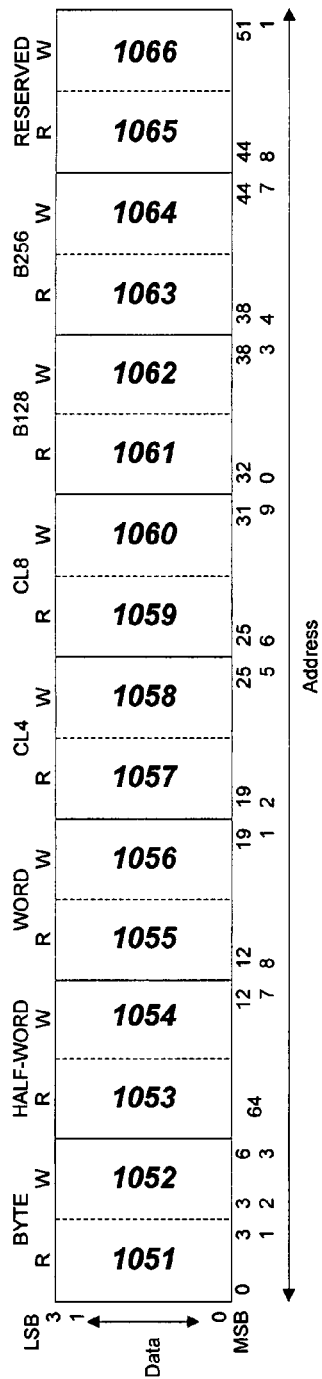
FIG. 10C is an example organization of data contents within the memory of a PM.

The PM of the example embodiment, illustrated in FIG. 10B allows for the measurement of a histogram of transaction types and execution times of that transaction. FIG. 10C illustrates an example embodiment of how the BRAM 1006 might have its internal memory organized. The BRAM memory organization illustrates 16 different transaction buckets 1051-1066. Each transaction bucket is broken down into 32 time buckets. Each time bucket represents a 32-bit value that can accumulate the number of times a transaction's execution time has occurred for that specific transaction. For example, transaction bucket 1051 corresponds to a byte read transaction, while transaction bucket 1052 corresponds to a byte write transaction. Similarly, transaction bucket 1063 corresponds to a burst read of 256 words while transaction bucket 1064 corresponds to a burst write of 256 words. Note that in some instances, not all of the memory space is used in BRAM 1006, and thus, for example, transaction bucket 1065 and 1066 are left unused. Importantly, each of the time buckets within a transaction bucket can accumulate $2^{32}$ events, since there are 32-bits of data available in BRAM 1006. The 32 time buckets contained within each transaction bucket correspond to a count of how many clocks the specified transaction took to execute. For example, if the scaling is set to count each clock separately, the minimum measured time is 2 cycles, and if a count of 3 is measured, then the second time bin within the transaction would have one added to it. As each subsequent transaction's time is counted, a count of one is added to each corresponding transaction and time bin.

Figure 10D:
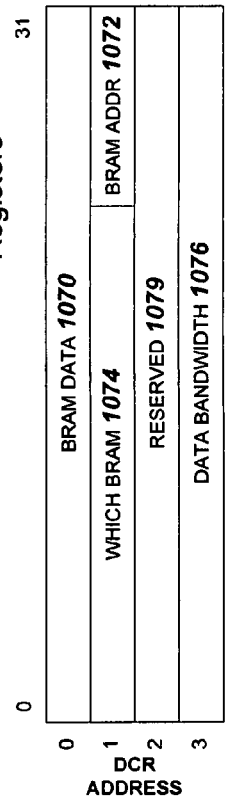
FIG. 10D is an example register model for an interface to read and/or write the data contents of the memory of a PM.

In some embodiments, the PM uses a DCR bus interface, as shown in FIG. 10B. Some bus interface types, such as DCR have very small address footprints, and therefore could not directly address all of the memory available within a single PM, let alone multiples PMs across multiple ports. In these types of systems, a so-called 'keyhole' register set is introduced which permits the memory(ies) to be fully addressed and read and written. FIG. 10D is an example embodiment for BRAM access registers 1080 provided to give a keyhole to access the memory. Read and writes are done to the BRAM access registers 1080 in order to set, clear, or read the data on the PMs or other BRAMs in the system. The register BRAM data 1070 is provided as the means of a conduit for the data that will go to or from the BRAM 1006, etc. The register labeled "WHICH BRAM" 1074 is used to determine which BRAM will actually be communicated with (e.g., BRAM 1006, BRAM 1036 or BRAM 1046). Similarly register 1072 is used to specify where within the BRAM the read or write will take place. (e.g., where within the BRAM Memory Organization of FIG. 10C). An optional register, data bandwidth 1076 can be provided which gives access to an aggregate data bandwidth number for the measured element (logic not shown in FIG. 10B.). For example, data bandwidth 1076 can be used to get an average, peak bandwidth, or both. In some embodiments, address space may be left unutilized by BRAM access registers 1080

It can be appreciated that the example PM embodiment illustrated in FIGS. 10A-10D is to illustrate the principles of measurement, accumulation, reading, writing, and control. Those skilled in the art will recognize a number of methods exist to measure a variety of performance related elements, as well as communicate information content to and from the memory in the PM. Each of those can replace the front end and/or back end logic shown in FIG. 1011

Configurable Data Path, Address Path, PHY Interface, and Pipelining

Data Path

The data path 318, as illustrated in FIG. 4, can be configured on a per-port and/or per-direction basis. The FIFOs 422, 424 and optional pipeline register 426 that receive and transmit data through the data path can be built, for example, from BRAMS, SRLs, LUT RAM or Registers. Read and write paths created through the FIFOs 422, 424 and optional pipeline registers 426, 428 are independent.

The size of FIFOs 422, 424 and optional pipeline registers 426, 428 can be adjusted according to embodiments of the invention. To provide efficient operation, the FIFOs for each data port may be changed or adjusted depending on the device or bus attached to a port. Examples of how data path can be morphed or changed are as follows. First, a DSPLB can only do certain transactions, but the DSPLB transactions will dictate minimum FIFO size. Using an SRL based FIFO can be an appropriate choice. In contrast, a PLB can do many transactions and will require a larger storage area, so it likely will be desirable to use BRAM to make the larger FIFO. Lastly, an OPB will typically only use a single word read/write, so a register-type FIFO may be desirable.

For latency control, if FIFO front and back end communicate at different speeds, the type and size of the FIFO can be adjusted in some embodiments of the invention. Previous structures forced fixed type with both end speeds fixed. With adjustable FIFOs, the front and back end speed can be selected depending on attached devices.

FIFOs can further be constructed to accommodate different width memories and NPI sizes according to embodiments of the invention. The optional pipeline registers 426, 428 can be programmably connected from the data path 318 through the PHY interface 310 (which also has registers configurable to accommodate different width memories) to the memory 350 to create a highly configurable data path. Additionally, optional pipeline registers 426, 428 can be used to adjust latencies within the system, act as temporary data storage elements for data realignment when PIMs 330 and memory 350 are of differing size, or act as simple retiming elements to advantageously improve the data path timing. The variable data path allows for different size memory data widths while maintaining a constant interface to the ports and/or different size port widths while maintaining a constant memory data width. Additionally, the configurable data path allows for management of differing clock ratios between the memory 350 and the PIMs 330. For example, changing the memory to PIM clock ratio from 1:1 to 1:2 requires the data path to be in a different physical configuration to properly accumulate and forward data on both sides of the data path. The configurable data path therefore yields high flexibility in implementation area, frequency of operation and architectural functionality.

The programmable data path can also include optional timing management logic (TML) 429 as shown in FIG. 4. This TML 429 is designed to create replicated optional pipeline registers 426 in the data paths to manage the number of loads for each data bit. The TML 429 can be used to keep the data paths that are at high frequency from being heavily loaded by the lower frequency data paths. This has two major effects. First, the latency on the high frequency data path is lower than on the slower frequency data path. Second, the operational frequency of the high frequency data path can now be met, or even enhanced due to how the loads are organized. Significantly, the TML logic is applied on a per-port, per-direction basis.

In some embodiments, it is preferable to have a single large centralized storage element (e.g., FIFO) per direction between PHY 310 and FIFOs 422, 424. Using optional large centralized FIFOs 425, 427, typically made from a BRAM, allows the FIFO 422 and/or FIFO 424 storage requirements to be lowered. For example, when a large number of ports are used, FIFOs 422 and 424 can consume a significant amount of logic real estate of the overall MPMC. Adding a 'front-end' FIFO may allow the FIFOs 422, 424 to be simple register or smaller SRL based FIFOs.

In some embodiments, optional large centralized FIFOs 425 and 427 can serve another advantageous purpose. In many systems, it is desirable to decouple the frequency of memory 350 from the frequency of ports 340. It is further desirable to run memory 350 at the highest possible clock rate that memory 350 is allowed to operate in order to gain additional data bandwidth. Using optional large centralized FIFOs 425, 427 permits the decoupling of frequencies across a single domain. The very high clock rate of memory 350 can have its data path very lightly loaded by directly connecting only to FIFOs 425 and 427. This smaller loading increases the frequency that the memory side of the FIFO may be able to run at.

In yet another embodiment using the optional large centralized FIFOs 425, 427, the data path FIFOs 422, 424 may be able to be removed entirely. By using a BRAM for FIFOs 425, 427, the data from memory 350 can be placed in differing locations within the BRAM corresponding to the port that the data corresponds to. With appropriate adjustments to arbiter 316 and control state machine 314, it is possible to eliminate one or more of the FIFO 422 and/or FIFO 424 from the data path. In such embodiments, the ports 'share' the data from the dual ported BRAM. One side attaches to memory 350 via PHY 310 and optional pipeline 426. The other side is shared by the NPI. In another embodiment, multiple BRAMs could be used in order to increase the aggregate data bandwidth possible so that the port side of the FIFOs 425, 427 can be increased. Note that this differs from the normal data path 318 in that there is no longer one FIFO per port per direction. Instead the ports have 'logical' FIFOs by their address context within optional centralized FIFOs 425, 427.

Address Path

Like the data path 318, the address path 312 is also programmable according to embodiments of the invention. The address can be programmed to be multiplexed or non-multiplexed by including multiplexers 415. An SRAM type memory may not use a multiplexed address, while a DRAM type memory may. Thus, the multiplexers 415 of FIG. 4 can be optionally included or not included. Multiplexers 417 are used to choose which port's address will be selected and ultimately presented to memory 350 via PHY 310.

In some embodiments, per port FIFOs 412 are included in order to allow for transactions to be queued. This gives the MPMC arbiter 316 a priori information to begin arbiting for access to the memory long before it is needed. The result is a substantially more efficient use of both memory 350, and the bus(es) connected to ports 340. In other embodiments, per port FIFOs 412 may be single registers (e.g., a 1 deep FIFO). In still other embodiments, typically where the entire system is fully synchronous at a single rate, FIFOs 412 may be eliminated entirely in order to reduce latency.

In some embodiments, the address size can be dynamically adjusted based on the memory device. In one embodiment, the address size is dynamically changed based on type of memory that is addressed. In this case, additional multiplexers (not shown) are used to 'reconfigure' the address to match the memory device requirement. This is a particularly important when two disparate memories are present as part of memory 350. For example, if two DIMMs that have differing addressing requirements are present within the system, accommodation must be made within address path 312 in order to be able to properly accommodate each DIMM.

In some embodiments, the address of each port is independently settable. With adjustable addresses, each port can have address space of its own. However, an overlap between two addresses can also be generated. In some occasions, this is a desirable effect. The address path 312 permits address overlapping, address offset, address replication and address aliasing between ports. FIGS. 11A-11B illustrate various types of addressing based on this potential address overlap, offset, replication and aliasing.

FIG. 11A illustrates the concepts of address overlap, offset, replication and aliasing using an example of how five different ports might be setup according to embodiments of the present invention in a five port MPMC. Memory physical address space 1190 graphically shows how the five ports might appear within the physical address space of memory 350. Note that Port 0 and Port 1 have some address space within the memory that overlaps. Port 2 (and 2A as described below) has address space that is effectively doubled in size from the perspective of the port, but is only ½ the size in the actual memory. For example, the addressees specified when Port 2 communicates in address range 0x3000_0000 to 0x4000_0000 will actually result in memory transactions in the corresponding address range of 0x2000_0000 to 0x3000_0000 respectively. Port 3 demonstrates a simple offset of address such that the port address and memory address are the same, but are offset from where, for example, Port 0 will communicate with memory. Port 4 demonstrates the concept of aliasing. That is, the address the port uses to communicate with memory is aliased to the memory in a different location (e.g., port access to 0x2000_0000 corresponds to 0x0000_0000 in the memory). Lastly, Port 5 illustrates a simple large range of addresses that encompass all the other ports ranges of addresses. In such a situation, Port 5, and Port 5 alone can communicate with every location of memory that any other port communicates with. To provide further delineation, Port 0, Port 4, part of Port 5 and part of port 1 all share the same memory. However, Port 2 cannot talk to any of the memory that Port 0, Port 1 and Port 4 have access to.

FIG. 11B demonstrates the Ports logical address space 1100. This diagram usefully shows how each port has a base address and high address. Port 0 has base address 1102 and high address 1104. Similarly, Port 1 has base address 1112 and high address 1114 while Port 2 has base address 1122 and high address 1124. Port 3 has base address 1132 and high address 1134. Port 4 has base address 1142 and high address 1144. Lastly, Port 5 has base address 1152 and high address 1154.

FIG. 11B also shows the following significant items: First, base address 1102 of Port 0 and base address 1152 of Port 5 are set the same. Second, the high address 1114 of Port 1 and base address 1122 of Port 2 as well as base address 1132 of Port 3 are set the same. Third note that base address 1112 of Port 1 is set higher than base address 1102 but lower than high address 1104 of Port 0. The results from these configurations demonstrate overlap 1172 where Port 0 and Port 1 share a part of their address space. This is useful for inter process communications (IPC) so that the shared part of the memory is available to both parts, but there is additional unique memory available for each port separately.

Another configuration demonstrated in FIG. 11B is offsets 1174, 1177 and 1178. Here we see that the address of Port 1, Port 2 and Port 3 are each offset from the bottom of the ports logical address space, respectively. Offsetting is useful to achieve either overlapping of addresses, as described above, or to simply separate address spaces between ports. An example of the latter might be where Port 1 and Port 2 are tied to processors each of which is running a separate operating system that requires its memory space to be separate.

Yet another configuration is shown via replication 1176 in FIG. 11B. Here the address from Port 2 is actually doubled in apparent size. That is, only ½ of the address space will be physically available in memory, but access by the port to either region will result in access to the memory within the ½ space. An excellent use for this is when a system has a video graphics controller and wishes to ensure that the video data does not go through the cache of the processor. The processor would keep the lower ½ cacheable and the upper ½ uncacheable. When the processor wanted to write data to the video screen, it would access the upper'/2 and not alter the contents of its cache.

FIG. 11B also demonstrates a fourth memory configuration via alias 1179. In this situation, the port believes that the memory is located far away from the bottom part of memory. For example the port will talk to address range 0x8000_0000 to 0x9000_0000, but will actually be communicating to the physical memory at address range 0x0000_0000 to 0x1000_0000. This can be useful for many purposes including apparent separation in the system between ports for debugging purposes. In some instances, systems have requirements on a port that it appear to be at a different address location but still see memory at the apparent physical address.

According to some embodiments of the present invention, provisions are additionally made to prevent collisions between overlapping addresses depending on programming of address size. For example, semaphores may be used to avoid or prevent collisions. This can be true of either an overlap in the physical memory space, and/or each port's logical address space.

FIGS. 11A-B demonstrate the wealth of possible address configurations which are possible due to the highly configurable nature of address path 312. Those skilled in the art will understand that these configurations can be mixed and matched on a per port basis, or even in some embodiments on a per port, per address, per direction basis. That is, read and write address could differ for each port, as well as each port having multiple logical address ranges that map to multiple physical memory address ranges using the above styles of configurations.

PHY Interface

The PHY interface 310 according to some embodiments of the present invention is provided that can be parameterized so that data is aligned to match the type of memory connected to the MPMC. The PHY Interface 310 according to some embodiments of the invention is more than a conventional group of registers with clocking. The PHY interface 310 provides for versatile data alignment. Instead of using a state machine to read data and look for a data address strobe (DAS) or column address strobe (CAS) to align data before sending/receiving to/from the PHY interface, embodiments of the PHY layer of the present invention look at data itself.

Figure 12:
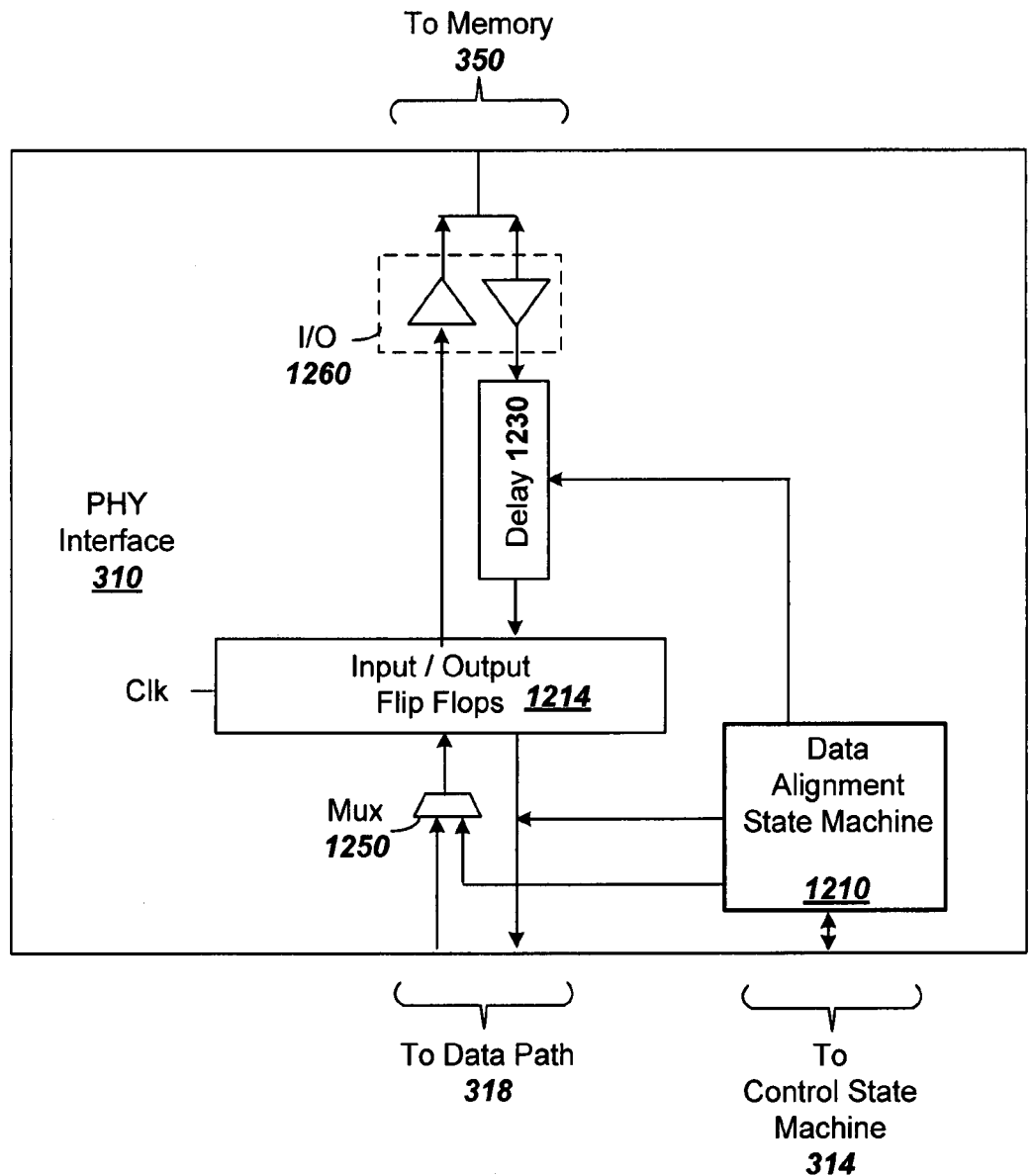
FIG. 12 illustrates exemplary structure of a PHY interface according to one or more embodiments of the present invention.

As shown in FIG. 12, the PHY of embodiments of the present invention include data alignment state machine 1210 to read and write the header, payload and footer to/from memory 350 and use the header, payload and footer information to provide precise data alignment using delay 1230 before data is applied to flip-flops 1214. A specific data-training pattern is used that conceptually includes a header, payload and footer. The header is used to identify an edge within the data whereas the payload and footer are used together to ascertain which edge is the first edge of the intended data. The footer also serves to ensure that last edge of data can be fully captured.

The data alignment state machine 1210 is typically only used during initialization of memory 350. During the training period, state machine 1210 must communicate with multiplexer 1250 to force write data to memory 350 at the appropriate time. The state machine 1210 will control the delay element to properly set the delay upon completion of the training. In one embodiment state machine 1210 begins with the delay set to some value, and steps through each delay value possible until it identifies when data first starts being aligned correctly, and then continues on until it has exhausted the maximum value of the delay, memorizing the points where the data first started to be correct, and where it first stopped being correct. State machine 1210 will then reset the delay 1230 to the midway point between where data first started being correct and where it last was correct. With the PHY embodiments of the present invention, latency is reduced and data alignment is more efficient.

Unlike conventional MPMCs that aligned the data 4 or 8 bits at a time using data strobes, the present PHY embodiment can also align individual bits. With sufficient FPGA input/output hardware, it is also capable of adjusting read and/or write timing on a per-port basis. This is strongly advantageous because it can correct for common mistakes in printed circuit board routing between an FPGA and connected memory device.

Further still, the present PHY interface embodiments are capable of easily connecting to different memory types. While the primary function of the PHY interface is data alignment, it can be appreciated by those skilled in the art that the PHY interface can easily be altered to accommodate a number of different types of memory including SDRAM, DDR SDRAM, DDR2 SDRAM, SRAM, BRAM, RLDRAM, and nearly any other memory technology which the input/outputs of the FPGA can communicate with.

Intelligent Pipelining

In one embodiment, optional pipeline registers 538 as illustrated in FIG. 5A are included to control provision of the initial sequence and other control signals from the arbiter BRAM 520 to the control state machine 314. The optional pipelines 538 can be selectively added on each port between the arbiter 316 and control state machine 314 of the memory controller. The additional signals include an indication of which port has been granted memory access as well as an indicator of when a sequence has started. The optional pipelining can achieve improved performance, particularly when a large number of ports are used.

The optional pipelining of registers shown can likewise be included in other areas of the memory controller. For example, as shown in FIG. 4, optional pipelining 426 and 428 can be used in the data path logic 318. Further the optional pipelines 411 can be used in the address path logic 312. Intelligent pipelining allows user program control over a variety of pipeline stages in order to permit a customer to trade off FPGA area for maximum frequency performance. The location of these optional pipelines and their ability to be controlled on a per-port basis achieves greater flexibility and performance.

In some embodiments of an MPMC of the present invention, the optional pipelines can be dynamically employed as needed. For example, if two disparate DIMMs make up memory 350, one configuration of the optional pipelines can be used when communicating with the first DIMM, whereas a second differing configuration can be used when communicating with a second DIMM. This dynamic ability advantageously provides the best performance for both DIMMs.

In some embodiments, the characteristics of the MPMC for configuring the intelligent pipelining, address path, data path, control path and PHY path are obtained by reading so-called Serial Presence Detect (SPD) Read Only Memory (ROM) typically found on Dual Inline Memory Modules (DIMMs). The SPD ROM is well known in the art. In some embodiments some or all of the variables that affect the MPMC can be read from the SPD ROM, and then enacted in the MPMC structure. This could include configuring the address path, data path, control path, number, type and size of FIFOs used, as well as other memory unique information. In some embodiments, the MPMC's function can be altered dynamically depending upon which of several DIMMs the MPMC is communicating with. This is particularly useful when multiple disparate DIMMs are placed within a system.

Versatile Graphical User Interface

The MPMC implemented using an FPGA can be programmed in some embodiments through a Graphical User Interface (GUI) that provides advantages over prior art. First, the GUI allows system topology creation as well as programming of the MPMC to form a complete project that can be run through Electronic Design Automation (EDA) tools. Previously, GUIs only allowed programming of a single core at one time. With embodiments of the present invention, the GUI can be data driven from user editable text files. It can also offer feedback on resource utilization. Further, it can provide performance feedback estimates based upon the current programmable settings for each port. The GUI can allow users to create sets of data for their configurations of an MPMC and to reuse those for future projects. The GUI uses the information entered to dynamically create an entire core for the MPMC as well as peripherals and processors while providing intelligent design rule checking both as information is being entered, as well as during operation when the GUI dynamically creates complex hardware. The GUI can also be used to display information content from the Performance Monitor(s) within an MPMC system. In some embodiments, this information can be used to dynamically update the arbitration scheme currently in use in the MPMC system. Thus the GUI need not only be used for configuration of the MPMC based system.

FIGS. 13-17 provide screen shots of a GUI demonstrating an example GUI according to embodiments of the present invention. The screen shots are presented to illustrate some key components for a GUI that are advantageous in configuring MPMCs in an FPGA. Additionally, the screen shots can help elucidate new principles in GUI development that are advantageous outside their use with MPMC systems.

Figure 13:
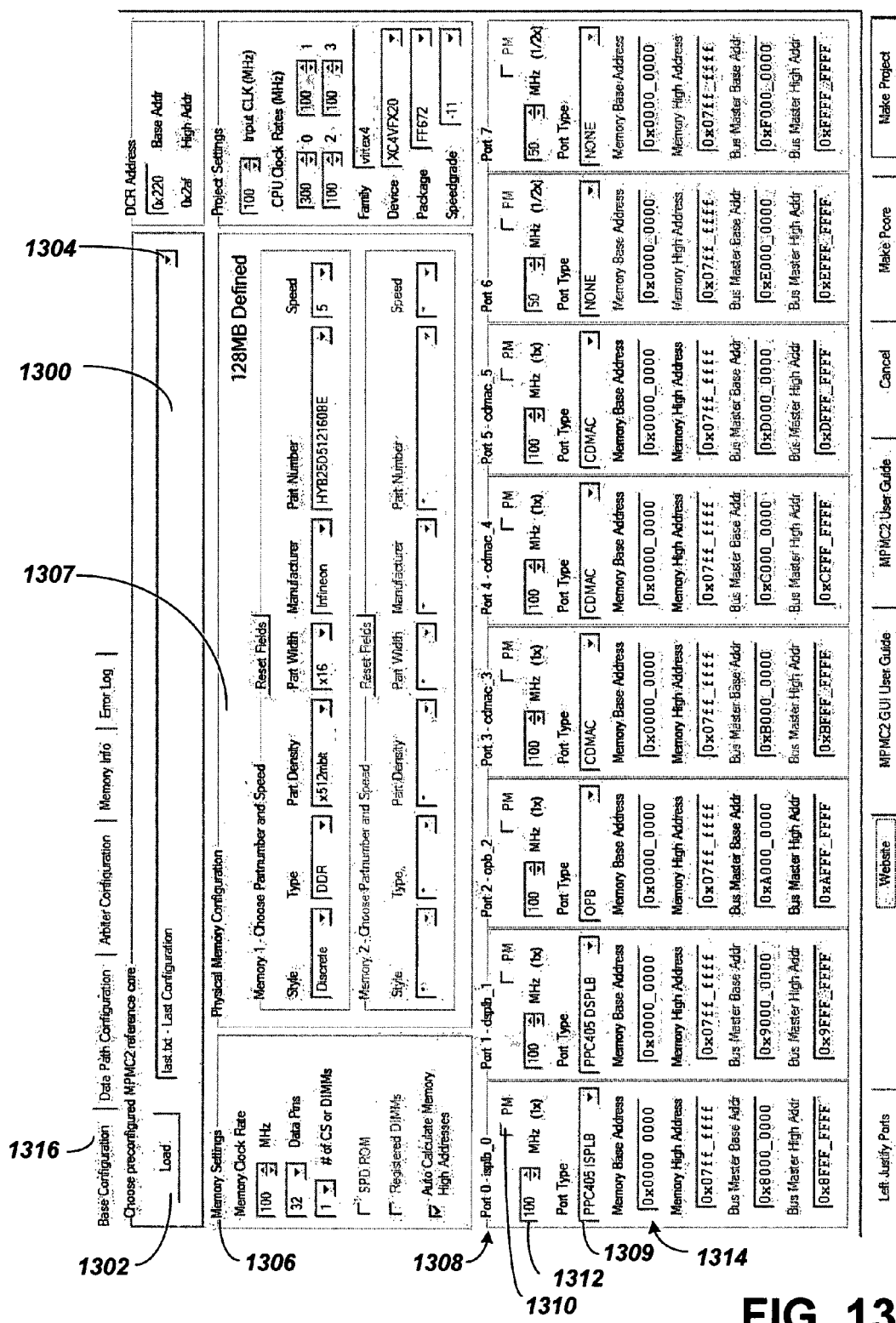

FIG. 13 shows an example of the main or "Base Configuration" tab 1316 of the GUI. Here a user will have the opportunity to load past configurations, set various options that affect what is built, create the MPMC core as a standalone entity, or create an entire system based upon the present settings within the GUI. Importantly, a design may first be loaded that is identifiable in a user editable text file 1300 selected using drop down menu 1304 and loaded using button 1302. The GUI displayed can be used to change parametrics of the MPMC and/or system. The text files that contain the MPMC configuration information can be copied and placed within a directory that the GUI creates. These files are then dynamically available from the drop down menu tab 1304 of preconfigured MPMC cores.

FIG. 13 further shows settings in region 1306 and region 1307 of the memory 350 to be attached to the MPMC. These are used to read in specific manufacturer memory devices and to intelligently control what configuration the MPMC will need to be in. The physical memory configuration information is also text file data driven using region 1307, and file information can be added to by the user, the author of the GUI, or a memory manufacturer. Additionally, the text files used for region 1307 permit the drop down boxes in region 1307 to have their content dynamically set based upon the organization structure of those text files. The act of selecting an element from the final drop down box in region 1307 results in loading the specified file content into the GUI and advantageously intelligently setting various MPMC control parameters. It should be appreciated by those skilled in the art that these techniques can be applied to many differing types of GUIs.

FIG. 13 further shows the configuration of the PIMs in regions 1308. Each port can have a different type of PIM as shown in the Port Type drop down field 1309, and can further have the Performance Monitors (PM) enabled or disabled by check box 1310 as needed. Each port can also have its clock frequency set using box 1312. Address configuration information can be provided using boxes 1314. The GUI contains intelligence to guide users and help them prevent mistakes. These include dynamic rule checking to ensure entered data conforms to the format and type of information required, as well as pop-up dialogs when an error or warning is encountered. Further, each data entry point contains mouse over text that helps to explain what the data entry point is for. FIG. 13 also demonstrates the use of tabs to organize information presentation to the user. Significantly, in FIG. 13, the "Base Configuration" tab 1316 was designed so that most users would never have to use the other tabs, and yet still perform the configuration they wished to achieve. The other tabs are available when additional user control is desired.

Figure 14:
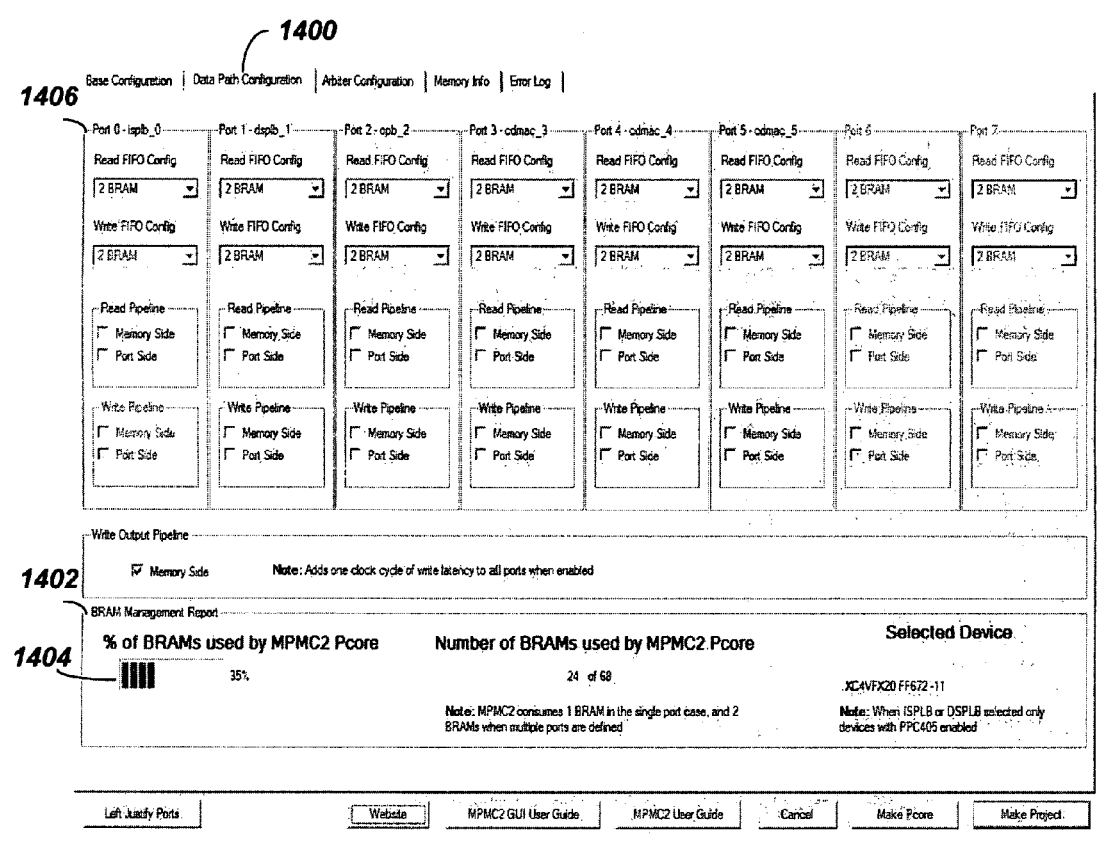

FIG. 14 shows additional per-port configuration information. In this case, the data path configuration is shown that can be accessed using the "Data Path Configuration" tab 1400. Here is where the user will specify some of the common constraints that are used to determine the size, style and operation of the data path FIFOs referred to in FIG. 4. Additionally, FIG. 14 shows an example of area utilization reports, here the "BRAM Management Report" 1402. It can be appreciated by one skilled in the art that additional information could be reported such as the total FPGA area, predicted frequencies of operation, and fit for a particular FPGA. Further, a "thermometer" 1404 is provided in the management report area 1402 that can graph as well as turn various colors to represent how close to fully utilized the number of elements which are provided within the selected FPGA are. For example, it turns yellow to indicate when the configuration is close to exhausting the resources, and red when the resources are exhausted. This provides additional visual clues that are important to the user in order to correctly configure the MPMC.

FIG. 14 also shows an example of user control over pipelining for the individual data path ports using regions 1406. This includes "Read Pipeline" and "Write Pipeline" fields that all pipeline control using check boxes. In some embodiments, the pipelining is automatically set based upon other choices the user has made in the GUI. For example, when the user loaded a particular manufacturer's part number for memory 350 in region 1307, specific information within the file loaded will cause a design rule check which will result in specific ports having their pipeline stages independently enabled/disabled. This kind of intelligence greatly assists a user from making a mistake, and is one essential component to so-called 'ease of use'.

Figure 15:
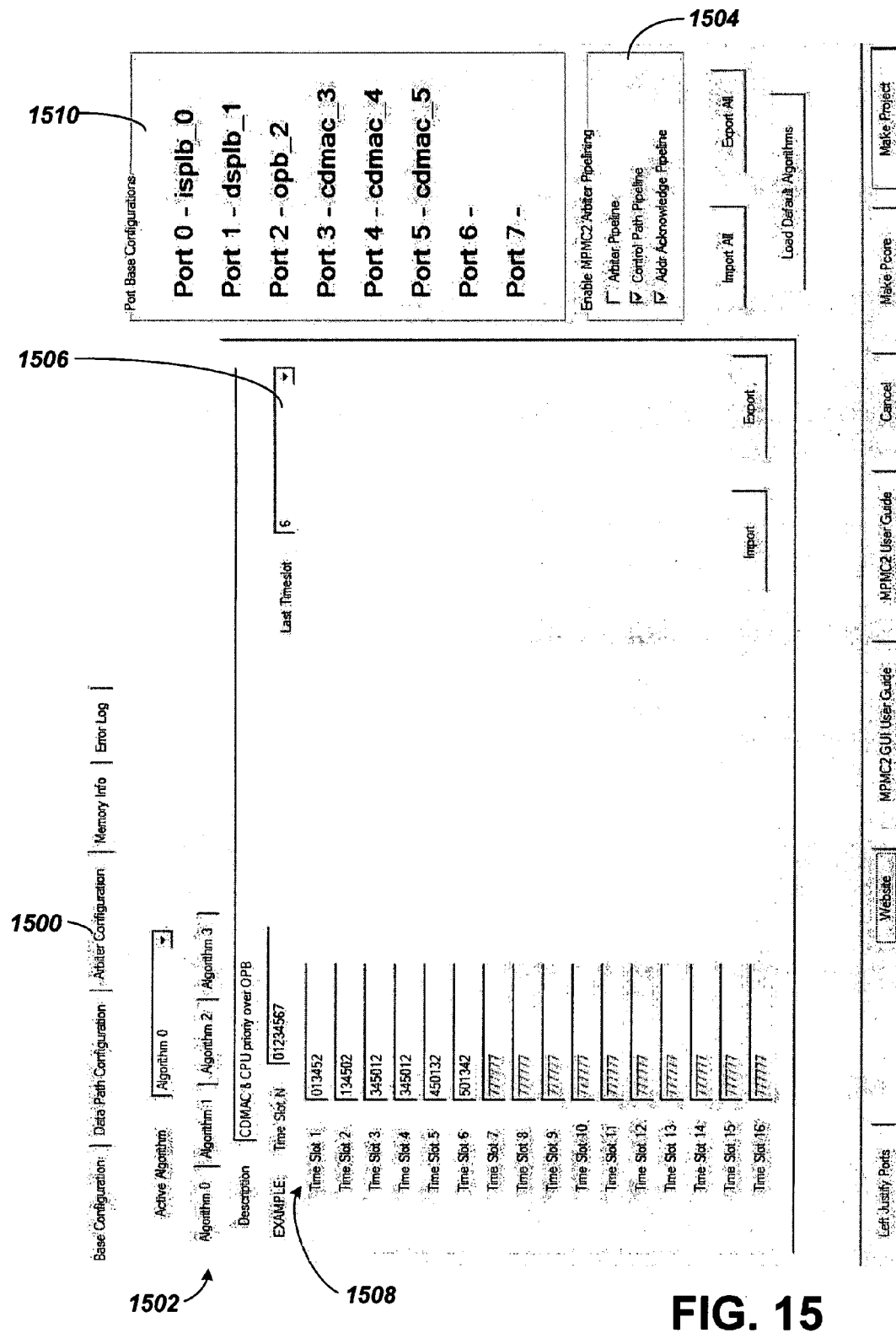

FIG. 15 shows an example of the static arbitration configuration means selected using the "Arbiter Configuration" tab 1500. Here, the user has the freedom to load and save configurations, again of user editable text files, to effect a particular arbitration scheme. Significantly, the GUI allows multiple algorithms to be stored and/or loaded using tabs 1502, including default algorithms. FIG. 15 further illustrates another example means to control and configure the pipeline stages, this time within the arbiter using check boxes 1504. These are loaded by the load button 1302 on FIG. 13, or in some embodiments by intelligent design rule checking, but are still changeable by the user within the Arbiter Configuration tab 1500 in region 1504. FIG. 15 also demonstrates an easy means to adjust important arbiter characteristics, and guides the user in so doing. For example, the total number of time slots is settable using drop down 1506, which then enables or disables the edibility of the timeslots. Within each timeslot 1508, the dynamic rule checking ensures that the typed in data is of the correct form, and notifies the user via colorization of the text when it is incorrect. Lastly, the arbiter configuration tab 1500 of the GUI offers information in the aliasing of the port names to the port numbers. Entering data in the Time Slot editable boxes is done via port number to keep it easier to understand and less work to type—but the user needs to know what interface each port number corresponds to. The GUI provides the Port Base Configuration field 1510 in FIG. 15 to assist the user in knowing the context of each port.

Figure 16:
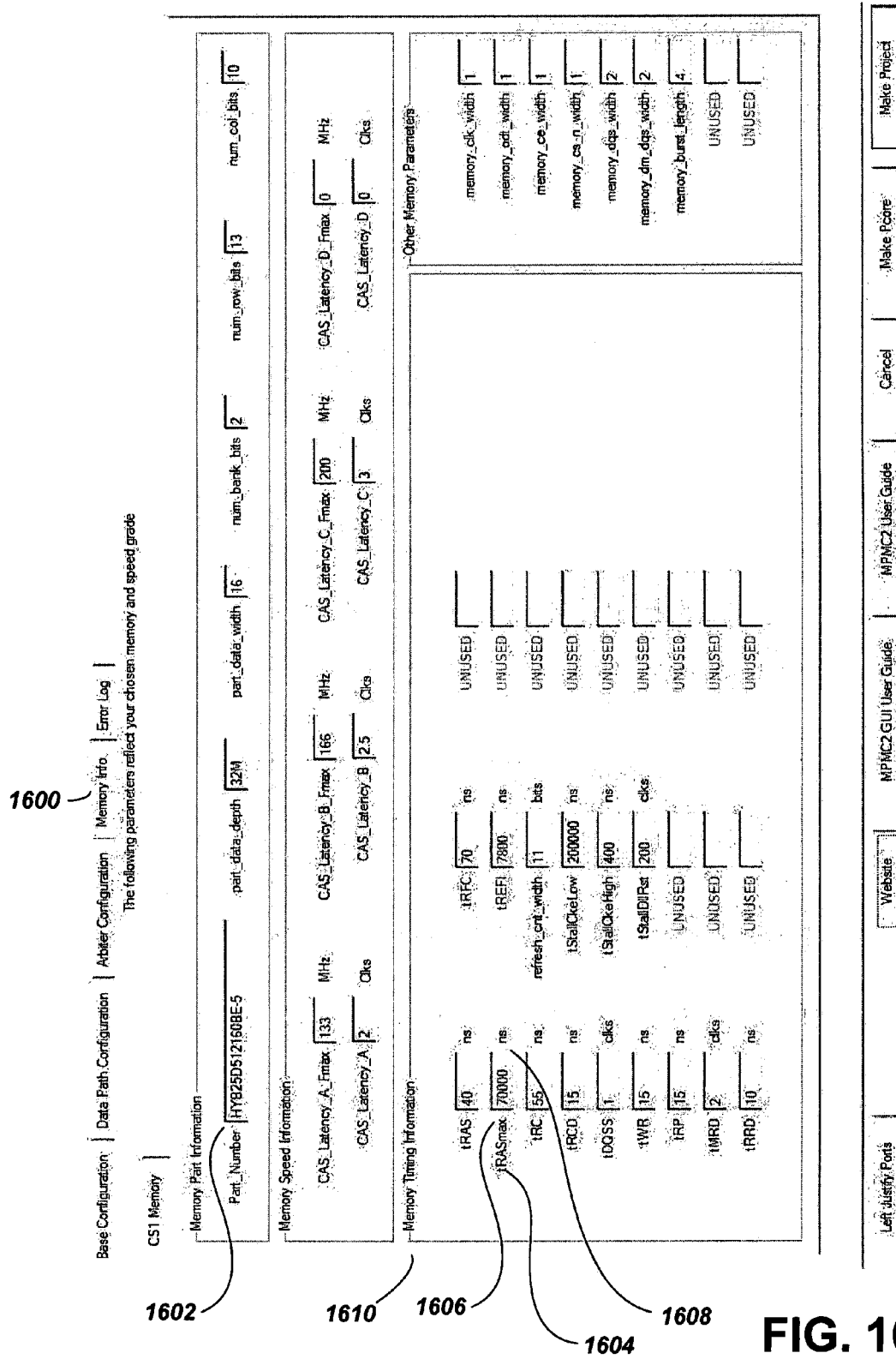

FIG. 16 shows the "Memory Info" tab 1600. This tab is significant for two reasons. First, it provides a highly detailed summary to the user of specific parameters that a selected memory device to attach to an MPMC requires. Second, it illustrates the application of a completely dynamically generated content of the GUI from English text files. The former is of interest to users because they may wish to verify that the data the GUI will be using matches what the selected memory actually requires. The latter is significant because data driven files populate the content of the GUIs fields for this tab. For example, based purely upon the Part_Number 1602, the remaining fields within the GUI are automatically loaded when the user selected the Part_Number from region 1307 in FIG. 13. An array of English text files, indexed by Part_Number, are used to populate the remaining fields. For example, the parameter 1604 fields, value 1606 fields, and unit 1608 fields from within Memory Timing Information box 1610 are all populated from the contents of this text file dynamically. Additionally, when the text file is read in, populating the visible data shown in FIG. 15, it also loads the so-called "mouse over" information. This is the information that pops up when a user pauses the mouse pointer over an element to help explain the purpose of the particular element. This is a significant embodiment because it means that many disparate types of memory can be added simply by adding a text file and the compiled source code of the GUI does not need to change. One skilled in the art will recognize the value of not having to maintain the GUI to add completely new features. This aspect of the present invention is readily usable in many other applications than MPMCs.

Figure 17:
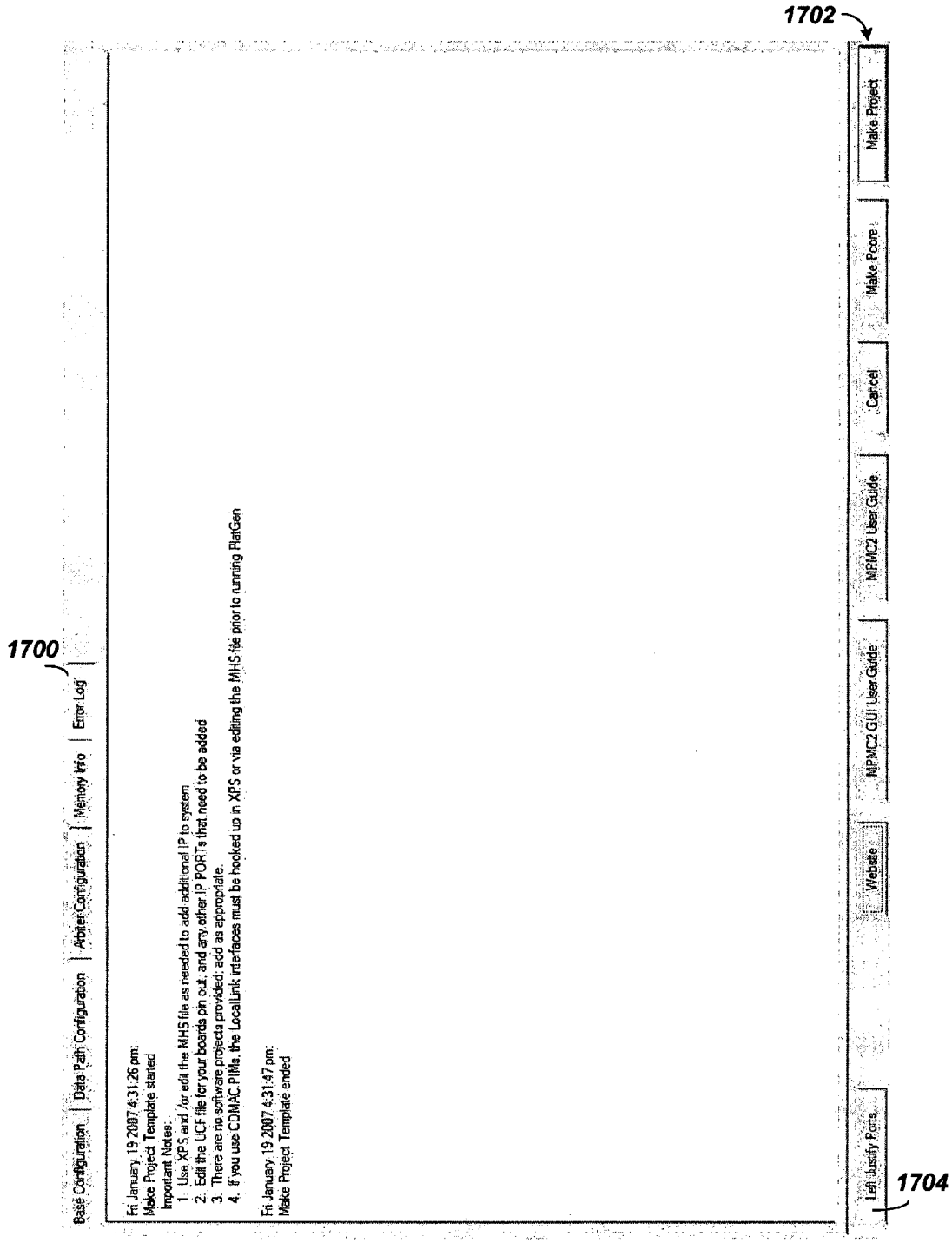

FIG. 17 demonstrates the "Error Log" tab file 1700 that is produced upon running the GUI to configure the MPMC or the MPMC system. In addition to writing a log file to a specific location, the log file is also shown within the context of the GUI. This prevents a user from having to waste time looking for another application beyond the GUI to have all relevant information.

FIGS. 13-17 also demonstrate a number of buttons on the bottom, such as buttons 1702 shown in FIG. 17. These buttons are used to control the creation of MPMC core or system, as well as provide direct access to the documentation related to MPMC. Additionally, the buttons demonstrate a third function that is a control function, global in scope to the GUI. In this case, that function is to Left Justify Ports, from the button 1704 of that name, causing any gaps in the ports shown in FIG. 13 and FIG. 14 to be removed. It can be appreciated that other global scope functions could be included within these buttons and that these buttons differ in function from the documentation or program control functions.

In some embodiments of the present invention, different frequencies are allowed to be used within the memory control portion of MPMC. This affects the address path 312, control path state machine 314, port arbiter 316 and in some instances, portions of data path 318. Memory 350 is often a double data rate memory where the data appears on both edges of the clock. There are two typical methods to handle this situation, namely double the output-width or double the frequency of the data path. Doubling the frequency of the data path is typically difficult, and thus the usual alternative choice of doubling the output width is selected. However, there is an additional opportunity available to slow down paths within the MPMC based upon some memory technologies. In some instances, including DDR memory, it is possible to run the address and control signals to the memory at ½ the speed of the clock. In some embodiments of the present invention, the PHY interface 310 can contain I/O registers that are clocked at the normal clock rate of the memory, but are fed by information clocked at ½ that rate, and the I/O registers have asynchronous set/reset pins. The control logic (address path 312, control state machine 314, port arbiter 316, and parts of data path 316) is altered as needed to operate at this ½ clock rate of memory 350.

Additionally, some extra logic can be placed within control state machine 314 which runs at the clock frequency of memory 350 and is used to drive the previously mentioned set/reset signals going to the I/O registers within the PHY interface 310. These signals are used to make the signals coming from PHY interface 310 appear as though they are clocked by the memory clock. For example, in DDR memory, there is an activate command followed by a no operation command. The PHY interface would be handed just the activation command at ½ the clock speed of memory 350, but also would be handed the set/reset signals to effect the no operation command at the right time. The net effect of these combinations is the ability to run the memory 350 at much higher effective clock rates than previously possible.

It can be appreciated by one skilled in the art that the logic structures of embodiments described herein could be implemented advantageously using Programmable Logic Device (PLD) technology, more specifically, FPGA style PLDs. However, other implementations are possible using other technologies, such as an Application Specific Integrated Circuit (ASIC), standard cell, or even full custom. These implementations can be "fixed" from the originally programmable implementations in order to accomplish a specific purpose. As such, the present invention need not be limited exclusively to FPGA technology, as one skilled in the art can appreciate.

Although the present invention has been described above with particularity, this was merely to teach one of ordinary skill in the art how to make and use the invention. Many additional modifications will fall within the scope of the invention, as that scope is defined by the following claims.

What is claimed is:

1. A graphical user interface (GUI) for programming hardware elements, the GUI executing on a processor and comprising:
a processor;
an interface displayed on a computer screen to allow generating hardware elements of a Multi-Port Memory Controller (MPMC), the interface comprising: a plurality of user selectable inputs enabling, for each port of a plurality of ports of the MPMC, the selection of a port type of a plurality of port types and port configuration information, a plurality of user selectable inputs associated with a memory coupled to the MPMC and enabling the configuration of a programmable physical interface of the MPMC coupled to the memory, wherein the programmable physical interface comprises a delay element coupled between an I/O port of the programmable physical interface and registers of the programmable physical interface, the delay element controlling the receipt of the data signals at the registers, a plurality of user selectable inputs enabling the selection of memory elements of data paths of the MPMC between the plurality of ports and the memory coupled to the MPMC, and a plurality of arbiter configurations, each arbiter configuration adapted to effect an arbiter scheme for the data paths of the MPMC between the plurality of ports and the memory coupled to the MPMC;
a set of input control files each of which contain a representation of parameters of the hardware elements in order to specify the settings for the hardware elements within the GUI, said set of input control files being user selectable within said GUI; and
GUI control files each of which contains a representation of information content to be displayed within the GUI based on the settings specified.

2. The GUI of claim 1, further comprising:
rule checking files that contain representations allowing addition of rules to a dynamic rule checker built into said GUI.

3. The GUI of claim 2, further comprising:
dynamic notification to a user when user input does not match specified entry requirements within a field, wherein said dynamic notification presents a notification from said rule checking text file.

4. The GUI of claim 1, wherein said GUI control files provide dynamic content update to the GUI based upon user selection of differing elements within the GUI.

5. The GUI of claim 1, further comprising:
an interface to allow the building of cores from said hardware elements based upon the configurations specified with the GUI.

6. The GUI of claim 5, further comprising:
an interface to allow configuration of one or more cores; and
an interface to allow interconnecting one or more prebuilt cores with the one or more configured cores into a complete system based upon the configuration specified with the GUI.

7. The GUI of claim 1, further comprising:
an interface for a user to choose a given one of the input control text files from a selection of input control files,
wherein selection of the given input control text file results in loading into the GUI all relevant parameters to describe the intended behavior of the complex hardware elements, and
wherein loading of the given input control file results in contents of the GUI being updated to reflect said parameters.

8. The GUI of claim 1, wherein said GUI control files contain descriptive information to allow one or more parameters being changed by a user within the GUI to affect one or more parameters not being changed by the user.

9. The GUI of claim 1, further comprising:
intelligence within the GUI, based at least in part upon contents of one or more of the GUI control file and rule checking file, to dynamically alter a color associated with data being entered into the GUI by a user.

10. The GUI of claim 1, wherein the GUI enables creating hardware for a Multi-Port Memory Controller (MPMC) system.

11. The GUI of claim 1 wherein elements within one or more of said files have a one to one correspondence to elements in the GUI obviating the need for the GUI to have a separate database to manage said elements to increase the performance of said GUI.

12. A graphical user interface (GUI) for programming hardware elements, the GUI executing on a processor and comprising:
a processor;
an interface displayed on a computer screen to allow control of generation of hardware elements of a Multi-Port Memory Controller (MPMC), the interface comprising: a plurality of user selectable inputs enabling, for each port of a plurality of ports of the MPMC, the selection of a port type of a plurality of port types and port configuration information, a plurality of user selectable inputs associated with a memory coupled to the MPMC and enabling the configuration of a programmable physical interface of the MPMC coupled to the memory, wherein the programmable physical interface comprises a delay element coupled between an I/O port of the programmable physical interface and registers of the programmable physical interface, the delay element controlling the receipt of the data signals at the registers, a plurality of user selectable inputs enabling the selection of memory elements of data paths of the MPMC between the plurality of ports and the memory coupled to the MPMC, and a plurality of arbiter configurations, each arbiter configuration adapted to effect an arbiter scheme for the data paths of the MPMC between the plurality of ports and the memory coupled to the MPMC;
an interface to send and gather information from at least one performance monitor; and
a graphical representation within the GUI of the information gathered from the at least one performance monitor.

13. The GUI of claim 12, wherein said graphical representation comprises a histogram.

14. The GUI of claim 12, wherein said graphical representation comprises a timeline showing a relative time position of each relevant datum of the gathered information from the at least one performance monitor.

15. The GUI of claim 12, further comprising:
at least one rule recommendation file provided to the GUI that represents choices in controlling the hardware element generation based upon the gathered information from the at least one performance monitor; and
an interface to the hardware element generation based upon said rule recommendation file and said gathered information to provide a user with a choice of accepting or rejecting a recommended rule,
wherein acceptance of the recommended rule results in differently programming the hardware elements.

16. The GUI of claim 15, further comprising:
at least one rule choice presented graphically via points within a graph to show tradeoffs between parameters; and
an interface that allows a user to choose one of the points to accept the rule choice, wherein acceptance of the rule choice results in differently programming the hardware elements.

17. The GUI of claim 15, wherein the GUI enables creating hardware for the MPMC system.

18. A method of programming a Multi-Port Memory Controller (MPMC) comprising:
providing parameters in a graphical user interface (GUI) displayed on a computer screen for a memory to be attached to the MPMC and cores for connection to ports of the MPMC, the GUI comprising: a plurality of user selectable inputs enabling, for each port of the plurality of ports, the selection of a port type of a plurality of port types and port configuration information, a plurality of user selectable inputs associated with the memory and enabling the configuration of a programmable physical interface of the MPMC coupled to the memory, wherein the programmable physical interface comprises a delay element coupled between an I/O port of the programmable physical interface and registers of the programmable physical interface, the delay element controlling the receipt of the data signals at the registers, a plurality of user selectable inputs enabling the selection of memory elements of data paths of the MPMC between the plurality of ports and the memory, and a plurality of arbiter configurations, each arbiter configuration adapted to effect an arbiter scheme for the data paths of the MPMC between the plurality of ports and the memory coupled to the MPMC;
selecting control text files based on the parameters provided resulting in loading into the GUI of further relevant parameters for hardware elements for the MPMC; and
updating further relevant parameters of the GUI by accessing interface fields of the GUI.

19. The method of claim 18 further comprising:
displaying overlay text within said GUI informing a user of said parameters when a mouse pointer is provided over a point on a graph for a specific period of time; and
providing gravity to the mouse pointer to make the mouse pointer gravitate to a nearest point on said graph when the mouse pointer stops moving and holds the mouse pointer on said point until the mouse pointer moves again.

* * * * *